United States Patent
Ellison et al.

(10) Patent No.: US 7,058,721 B1
(45) Date of Patent: *Jun. 6, 2006

(54) DYNAMIC QUALITY ADJUSTMENT BASED ON CHANGING STREAMING CONSTRAINTS

(75) Inventors: Lawrence J. Ellison, Atherton, CA (US); David J. Pawson, San Mateo, CA (US); Mark A. Porter, Woodside, CA (US); William E. Bailey, Palo Alto, CA (US)

(73) Assignees: Broadband Royalty Corporation, Wilmington, DE (US); Thirdspace Living Limited, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/128,244

(22) Filed: Aug. 3, 1998

Related U.S. Application Data

(63) Continuation-in-part of application No. 08/859,860, filed on May 21, 1997, now Pat. No. 5,864,682, which is a continuation of application No. 08/502,480, filed on Jul. 14, 1995, now Pat. No. 5,659,539.

(51) Int. Cl.
*G06F 17/00* (2006.01)
(52) U.S. Cl. .................. 709/231; 725/145; 715/522
(58) Field of Classification Search ............. 709/227, 709/231, 232, 246; 345/327, 328; 348/18, 348/13, 399; 725/143, 145, 88–92; 715/522
See application file for complete search history.

(56) References Cited

U.S. PATENT DOCUMENTS

| | | | |
|---|---|---|---|
| 5,253,341 A | 10/1993 | Rozmanith et al. | 395/200 |
| 5,267,351 A | 11/1993 | Reber et al. | |
| 5,327,176 A | 7/1994 | Forler et al. | |

(Continued)

FOREIGN PATENT DOCUMENTS

WO  WO-96/20566 A1  7/1996

(Continued)

OTHER PUBLICATIONS

V. Srinivasan et al, "Fast and Scalable Layer Four Switching".

(Continued)

*Primary Examiner*—Dung C. Dinh
(74) *Attorney, Agent, or Firm*—Oblon, Spivak, McClelland, Maier & Neustadt, P.C.

(57) ABSTRACT

A method and apparatus for dynamic quality adjustment based on changing streaming constraints is provided. According to one aspect of the present invention, a video stream is sent to a client according to a set of streaming constraints. At least a subset of the video information in the video stream is sent from a first source. Next, a signal is received indicating a relaxation of streaming constraints corresponding to the video stream. In one embodiment, the signal is a freeze frame signal. In another embodiment, the signal is a slow motion signal. In response to the signal, a set of improved quality video information from a second source is accessed and sent to the client. According to one embodiment, the set of improved quality video information comprises a still image. According to another embodiment, the set of improved quality video information comprises a set of preprocessed video information ready to be streamed. As a result of the techniques described herein, an improved quality visual image is available for presentation on the client and, consequently, when a viewer requests a presentation rate that reduces the streaming constraints on a video streaming service, the improved quality video information may be sent using the freed-up portion of the bandwidth previously allocated to the client.

80 Claims, 14 Drawing Sheets

U.S. PATENT DOCUMENTS

| | | | |
|---|---|---|---|
| 5,568,180 A | | 10/1996 | Okamoto |
| 5,764,276 A | * | 6/1998 | Martin et al. ............... 725/146 |
| 5,808,660 A | * | 9/1998 | Sekine et al. ................... 348/8 |
| 5,978,835 A | * | 11/1999 | Ludwig et al. ............. 709/204 |
| 5,995,490 A | * | 11/1999 | Shaffer et al. .............. 370/260 |
| 6,014,694 A | | 1/2000 | Aharoni et al. |
| 6,038,257 A | * | 3/2000 | Brusewitz et al. .......... 375/240 |
| 6,172,672 B1 | * | 1/2001 | Ramasubramanian et al. .......................... 345/327 |
| 6,175,822 B1 | | 1/2001 | Jones |
| 6,195,683 B1 | * | 2/2001 | Palmer et al. .............. 709/204 |
| 6,373,855 B1 | | 4/2002 | Downing et al. |

FOREIGN PATENT DOCUMENTS

| | | |
|---|---|---|
| WO | WO-97/16023 A1 | 5/1997 |
| WO | WO-98/34405-AI | 8/1998 |

OTHER PUBLICATIONS

T.V. Lakshman et al, "High-Speed Policy-based Packet Forwarding Using Efficient Multi-dimensional Range Matching", Bell Laboratories.

FloodGate-1 Data Sheet, http://www.checkpoint.com/products/floodgate-1/descriptions/fgdata.html.

Check Point FloodGate-1, http://www.checkpoint.com/products/floodgate-1/descriptions/index.html.

Shaping Traffic Behavior, http://www.packeteer.com/tcprate/trfbhav.htm.

Playing Favorites-Packet Shaper Features, http://www.packeteer.com/products/features.htm.

T. Barzilai et al, "Design and Implementation of an RSVP based Quality of Service Architecture for Integrated Services Internet", IBM Research Report, R C 20617 (Nov. 8, 1996).

R. Engel et al, "Exploring the Performance Impact of QoS Support in TCP/ IP Protocol Stacks", IBM Research Report, RC 2100(94226) Feb. 18, 1998.

R. Engel et al, "Explicit TCP Rate Shaping: Architecture and Applications", IBM Research Report, RC 21019 (Jan. 21, 1998).

* cited by examiner

DYNAMIC QUALITY ADJUSTMENT BASED ON CHANGING STREAMING CONSTRAINTS

RELATED APPLICATION DATA

This application is a continuation-in-part application of U.S. application Ser. No. 08/859,860 filed on May 21, 1997 now U.S. Pat. No. 5,864,682, which is a continuation application of U.S. application Ser. No. 08/502,480 filed on Jul. 14, 1995, now U.S. Pat. No. 5,659,539, all of which are incorporated herein by reference in their entirety.

FIELD OF THE INVENTION

The present invention relates to a method and apparatus for processing audio-visual information, and more specifically, to a method and apparatus for providing improved quality video in response to relaxed streaming constraints.

BACKGROUND OF THE INVENTION

In recent years, the media industry has expanded its horizons beyond traditional analog technologies. Audio, photographs, and even feature films are now being recorded or converted into digital formats. To encourage compatibility between products, standard formats have been developed in many of the media categories.

MPEG is a popular standard that has been developed for digitally storing audio-visual sequences and for supplying the digital data that represents the audio-visual sequences to a client. For the purposes of explanation, the MPEG-1 and MPEG-2 formats shall be used to explain problems associated with providing non-sequential access to audio-visual information. The techniques employed by the present invention to overcome these problems shall also be described in the context of MPEG. However, it should be understood that MPEG-1 and MPEG-2 are merely two contexts in which the invention may be applied. The invention is not limited to any particular digital format.

In the MPEG format, video and audio information are stored in a binary file (an "MPEG file"). The video information within the MPEG file represents a sequence of video frames. This video information may be intermixed with audio information that represents one or more soundtracks. The amount of information used to represent a frame of video within the MPEG file varies greatly from frame to frame based both on the audio-visual content of the frame and the technique used to digitally represent that content. In a typical MPEG file, the amount of digital data used to encode a single video frame varies from 2K bytes to 50K bytes.

During playback, the audio-visual information represented in the MPEG file is sent to a client in a data stream (an "MPEG data stream"). An MPEG data stream must comply with certain criteria set forth in the MPEG standards. In MPEG-2, the MPEG data stream must consist of fixed size packets. Specifically, each packet must be exactly 188 bytes. In MPEG-1, the size of each packet may vary, with a typical size being 2252 bytes. Each packet includes a header that contains data to describe the contents of the packet. Because the amount of data used to represent each frame varies and the size of packets does not vary, there is no correlation between the packet boundaries and the boundaries of the video frame information contained therein.

MPEG employs three general techniques for encoding frames of video. The three techniques produce three types of frame data: Inter-frame ("I-frame") data, Predicted frame ("P-frame") data and Bi-directional ("B-frame") data. I-frame data contains all of the information required to completely recreate a frame. P-frame data contains information that represents the difference between a frame and the frame that corresponds to the previous I or P-frame data. B-frame data contains information that represents relative movement between preceding I or P-frame data and succeeding I or P-frame data. These digital frame formats are described in detail in the following international standards: ISO/IEC 13818-1, 2, 3 (MPEG-2) and ISO/IEC 11172-1, 2, 3 (MPEG-1). Documents that describe these standards (hereafter referred to as the "MPEG specifications") are available from ISO/IEC Copyright Office Case Postale 56, CH 1211, Geneve 20, Switzerland.

As explained above, video frames cannot be created from P and B-frame data alone. To recreate video frames represented in P-frame data, the preceding I or P-frame data is required. Thus, a P-frame can be said to "depend on" the preceding I or P-frame. To recreate video frames represented in B-frame data, the preceding I or P-frame data and the succeeding I or P-frame data are required. Thus, B-frames can be said to depend on the preceding and succeeding I or P-frames.

The dependencies described above are illustrated in FIG. 1A. The arrows in FIG. 1A indicate an "depends on" relationship. Specifically, if a given frame depends on another frame, then an arrow points from the given frame to the other frame.

In the illustrated example, frame 20 represents an I-frame. I frames do not depend on any other frames, therefore no arrows point from frame 20. Frames 26 and 34 represent P-frames. Again, a P-frame depends on the preceding I or P frame, consequently, an arrow 36 points from P-frame 26 to I-frame 20, and an arrow 38 points from P-frame 34 to P-frame 26.

Frames 22, 24, 28, 30 and 32 represent B-frames. Again, B-frames depend on the preceding and succeeding I or P frames. Consequently, arrows 40 point from each of frames 22, 24, 28, 30 and 32 to the I or P-frame that precedes each of the B-frames, and to each I or P-frame that follows each of the B-frames.

The characteristics of the MPEG format described above allow a large amount of audio-visual information to be stored in a relatively small amount of digital storage space. However, these same characteristics make it difficult to play the audio-visual content of an MPEG file in anything but a strict sequential manner. For example, it would be extremely difficult to randomly access a video frame because the data for the video frame may start in the middle of one MPEG packet and end in the middle of another MPEG packet. Further, if the frame is represented by P-frame data, the frame cannot be recreated without processing the I and P-frames immediately preceding the P-frame data. If the frame is represented by B-frame data, the frame cannot be recreated without processing the I and P-frames immediately preceding the B-frame data, and the P-frame or I-frame immediately following the B-frame data.

As would be expected, the viewers of digital video desire at least the same functionality from the providers of digital video as they now enjoy while watching analog video tapes on video cassette recorders. For example, viewers want to be able to make the video jump ahead, jump back, fast forward, fast rewind, slow forward, slow rewind and freeze frame. However, due to the characteristics of the MPEG video format, MPEG video providers have only been able to offer partial implementations of some of these features.

Some MPEG providers have implemented fast forward functionality by generating fast forward MPEG files. A fast forward MPEG file is made by recording in MPEG format the fast forward performance of an analog version of an audio-visual sequence. Once a fast forward MPEG file has been created, an MPEG server can simulate fast forward during playback by transmitting an MPEG data stream to a user from data in both the normal speed MPEG file and the fast forward MPEG file. Specifically, the MPEG server switches between reading from the normal MPEG file and reading from the fast forward MPEG file in response to fast forward and normal play commands generated by the user. This same technique can be used to implement fast rewind, forward slow motion and backward slow motion.

Although the above referenced techniques address the problem of displaying video at speeds other than normal speed, it does not address the issue of the quality of the video that is displayed. When video is displayed at a speed higher than 1x, the quality of each frame is not very important because the user doesn't have time to notice it. However, when the when the video is displayed at speeds slower than 1x, the user has more time to discern the details of the video, thus the quality of the video becomes important in such a circumstance.

In the techniques described above, regardless of the speed at which the video is displayed, the quality of the video does not change. That is, the quality of each frame of video remains the same regardless of whether it is displayed at a high speed (e.g., greater than 1x) or paused. If a frame is blurry during high speed play, it will be blurry during pause.

One point that should be noted is that when video is displayed at less than 1x speed or paused, streaming constraints are relaxed. The techniques described above do not exploit this relaxation in the streaming constraints.

An improved method for sending improved quality video information to a client is desired.

SUMMARY OF THE INVENTION

A method and apparatus for dynamic quality adjustment based on changing streaming constraints is provided. According to one aspect of the present invention, a video stream is sent to a client according to a set of streaming constraints. At least a subset of the video information in the video stream is sent from a first source. Next, a signal is received indicating a relaxation of streaming constraints corresponding to the video stream. In one embodiment, the signal is a freeze frame signal. In another embodiment, the signal is a slow motion signal. In response to the signal, a set of improved quality video information from a second source is accessed and sent to the client.

According to another aspect of the invention, a first reference point from the video stream is determined and is subsequently correlated to a second reference point in the second source.

According to one embodiment of the present invention, the set of improved quality video information comprises a still image. According to another embodiment, the set of improved quality video information comprises a set of preprocessed video information ready to be streamed.

As a result of the techniques described herein, an improved quality visual image is available for presentation on the client and, consequently, when a viewer requests a presentation rate that reduces the streaming constraints on a video streaming service, the improved quality video information may be sent using the freed-up portion of the bandwidth previously allocated to the client.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for dynamic quality adjustment based on changing streaming constraints is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various features of the invention shall be discussed under topic headings that appear in the following order:

I. OVERVIEW
II. TAG FILE GENERATION
III. DIGITAL AUDIO/VIDEO FILE STRUCTURE
IV. TAG FILE CONTENTS
V. SEEK OPERATIONS
VI. PREFIX DATA
VII. PACKET DISCONTINUITIES
VIII. BUFFER LIMITATIONS

IX. SPECIFIED-RATE PLAYBACK OPERATIONS
X. BIT BUDGETING
XI. FRAME TYPE CONSTRAINTS
XII. SUFFIX DATA
XIII. SLOW MOTION OPERATIONS
XIV. PAUSE OPERATIONS
XV. REWIND OPERATIONS
XVI. RUNTIME COMMUNICATION
XVII. FRAME ACCURATE POSITIONING
XVIII. MAPPING BETWEEN SOURCES
XIX. DISK ACCESS CONSTRAINTS
XX. VARIABLE RATE PLAYBACK OPERATIONS
XXI. NON-INTERACTIVE DIGITAL AUDIO-VIDEO EDITING
XXII. DISTRIBUTED SYSTEM

I. Overview

Figure 1A:
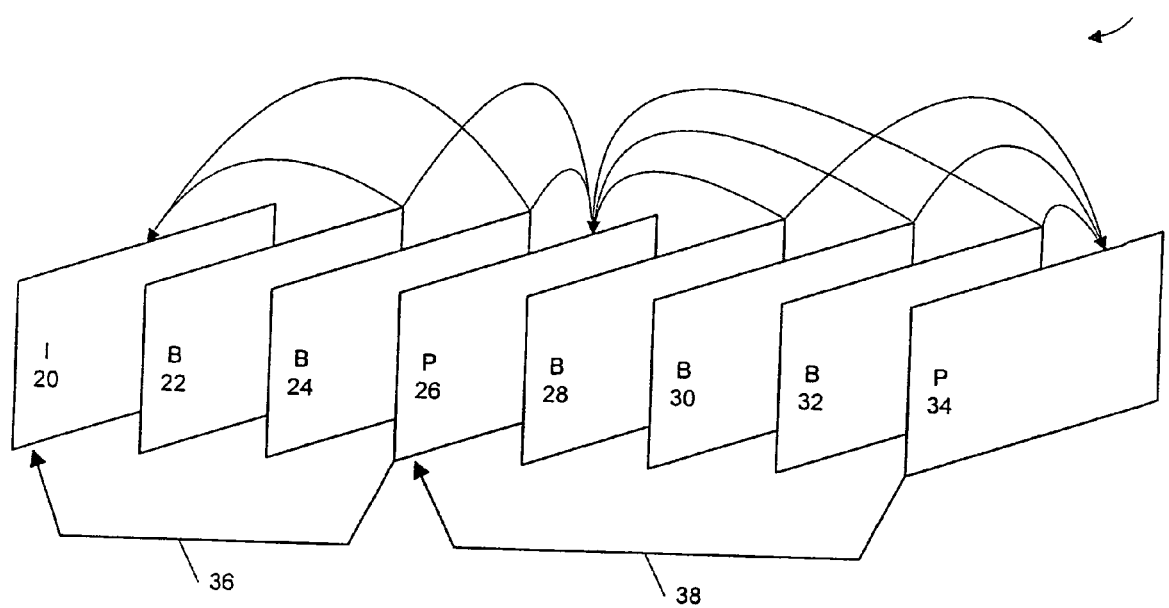
FIG. 1A is a diagram illustrating the dependencies between different frames in an MPEG data stream.
Figure 1B:
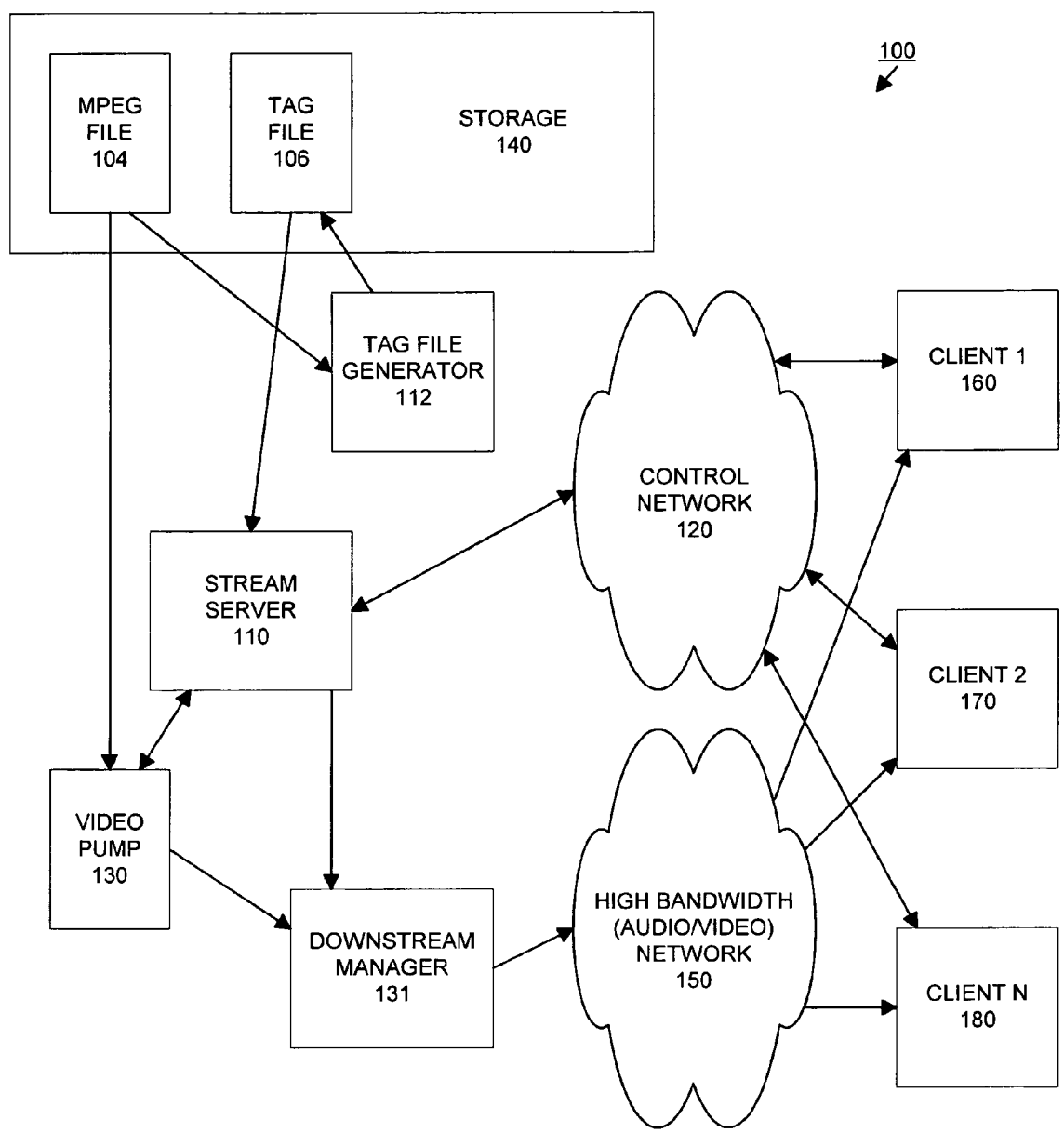
FIG. 1B is a block diagram of an audio-visual information delivery system according an embodiment of the present invention.

FIG. 1B is a block diagram illustrating an audio-visual information delivery system 100 according to one embodiment of the present invention. Audio-visual information delivery system 100 contains a plurality of clients (1–n) 160, 170 and 180. The clients (1–n) 160, 170 and 180 generally represent devices configured to decode audio-visual information contained in a stream of digital audio-visual data. For example, the clients (1–n) 160, 170 and 180 may be set top converter boxes coupled to an output display, such as a television.

As shown in FIG. 1B, the audio-visual information delivery system 100 also includes a stream server 110 coupled to a control network 120. Control network 120 may be any network that allows communication between two or more devices. For example, control network 120 may be a high bandwidth network, an X.25 circuit or an electronic industry association (EIA) 232 (RS-232) serial line.

The clients (1–n) 160, 170 and 180, also coupled to the control network 120, communicate with the stream server 110 via the control network 120. For example, clients 160, 170 and 180 may transmit requests to initiate the transmission of audio-visual data streams, transmit control information to affect the playback of ongoing digital audio-visual transmissions, or transmit queries for information. Such queries may include, for example, requests for information about which audio-visual data streams are currently available for service.

The audio-visual information delivery system 100 further includes a video pump 130, a mass storage device 140, and a high bandwidth network 150. The video pump 130 is coupled to the stream server 110 and receives commands from the stream server 110. The video pump 130 is coupled to the mass storage device 140 such that the video pump 130 stores and retrieves data from the mass storage device 140. The mass storage device 140 may be any type of device or devices used to store large amounts of data. For example, the mass storage device 140 may be a magnetic storage device or an optical storage device. The mass storage device 140 is intended to represent a broad category of non-volatile storage devices used to store digital data, which are well known in the art and will not be described further. While networks 120 and 150 are illustrated as different networks for the purpose of explanation, networks 120 and 150 may be implemented on a single network.

Figure 1C:
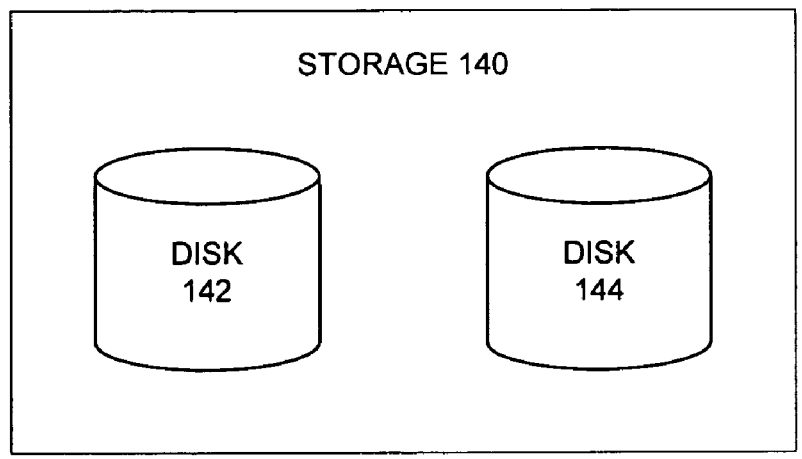
FIG. 1C is a block diagram of a storage device according to one embodiment of the invention.
Figure 1D:
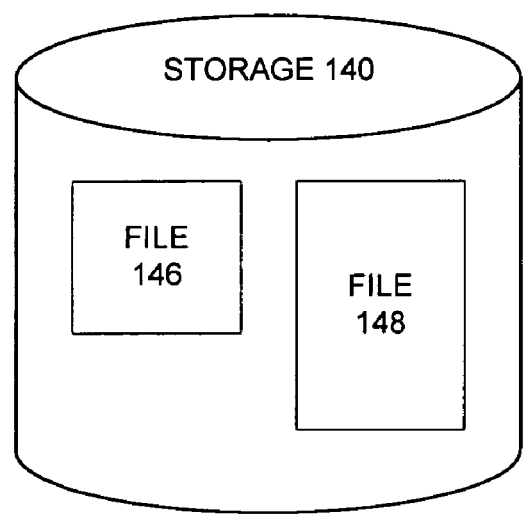
FIG. 1D is a block diagram of a storage device according to another embodiment of the invention.

FIG. 1C depicts the mass storage device 140 according to one embodiment of the present invention. In FIG. 1C, storage device 140 is depicted as having two separate disks 142 and 144 for persistent storage of data. For example, disk 142 may contain digital audio-visual information in MPEG format, whereas disk 144 may contain improved quality video information in a JPEG format. In another embodiment, disk 144 may contain improved quality video information in MPEG format. According to another embodiment, FIG. 1D depicts the mass storage device 140 as a single storage device having a logical partition for the separation of data. According to FIG. 1D, storage device 140 has two separate files 146 and 148, which each contain audio-visual information. For example, file 146 may contain digital audio-visual information in a MPEG format, whereas file 148 may contain improved quality video information (corresponding to file 146) in a JPEG format, or an MPEG format.

In addition to communicating with the stream server 110, the clients (1–n) 160, 170 and 180 receive information from the video pump 130 through the high bandwidth network 150. The high bandwidth network 150 may be any type of circuit-style network link capable of transferring large amounts of data. A circuit-style network link is configured such that the destination of the data is guaranteed by the underlying network, not by the transmission protocol. For example, the high bandwidth network 150 may be an asynchronous transfer mode (ATM) circuit or a physical type of line, such as a T1 or E1 line. In addition, the high bandwidth network 150 may utilize a fiber optic cable, twisted pair conductors, coaxial cable, or a wireless communication system, such as a microwave communication system.

The audio-visual information delivery system 100 of the present invention permits a server, such as the video pump 130, to transfer large amounts of data from the mass storage device 140 over the high bandwidth network 150 to the clients (1–n) 160, 170 and 180 with minimal overhead. In addition, the audio-visual information delivery system 100 permits the clients (1–n) 160, 170 and 180 to transmit requests to the stream server 110 using a standard network protocol via the control network 120. In one embodiment, the underlying protocol for the high bandwidth network 150 and the control network 120 is the same. The stream server 110 may consist of a single computer system, or may consist of a plurality of computing devices configured as servers. Similarly, the video pump 130 may consist of a single server device, or may include a plurality of such servers.

To receive a digital audio-visual data stream from a particular digital audio-visual file, a client (1–n) 160, 170 or 180 transmits a request to the stream server 110. In response to the request, the stream server 110 transmits commands to the video pump 130 to cause video pump 130 to transmit the requested digital audio-visual data stream to the client that requested the digital audio-visual data stream.

The commands sent to the video pump 130 from the stream server 110 include control information specific to the client request. For example, the control information identifies the desired digital audio-visual file, the beginning offset of the desired data within the digital audio-visual file, and the address of the client. In order to create a valid digital audio-visual stream at the specified offset, the stream server 110 also sends "prefix data" to the video pump 130 and requests the video pump 130 to send the prefix data to the client. As shall be described in greater detail hereafter, prefix data is data that prepares the client to receive digital audio-visual data from the specified location in the digital audio-visual file.

The video pump 130, after receiving the commands and control information from the stream server 110, begins to retrieve digital audio-visual data from the specified location in the specified digital audio-visual file on the mass storage device 140. For the purpose of explanation, it shall be assumed that system 100 normally delivers audio-visual information in accordance with one or more of the MPEG formats. Consequently, video pump 130 will retrieve the audio-visual data from an MPEG file 104 on the mass storage device 140.

The video pump 130 transmits the prefix data to the client, and then seamlessly transmits MPEG data retrieved from the mass storage device 140 beginning at the specified location to the client. The prefix data includes a packet header which, when followed by the MPEG data located at the specified position, creates an MPEG compliant transition packet. The data that follows the first packet is retrieved sequentially from the MPEG file 104, and will therefore constitute a series of MPEG compliant packets. The video pump 130 transmits these packets to the requesting client via the high bandwidth network 150.

According to one embodiment, video pump 130 can also retrieve data in file formats other than MPEG and can send not only real-time data, but non-real-time data (e.g., JPEG) too.

The requesting client receives the MPEG data stream, beginning with the prefix data. The client decodes the MPEG data stream to reproduce the audio-visual sequence represented in the MPEG data stream.

II. Tag File Generation

System 100 includes a tag file generator 112. The tag file generator 112 generates a tag file 106 from the MPEG file 104. For stored MPEG content, the tag file generation operation is performed by tag file generator 112 "off-line" (i.e., prior to any client request for MPEG data from the MPEG file 104). However, in certain situations, such a real-time MPEG feeds, tag file generation is performed in real-time during receipt of the MPEG data stream. Consequently, in one embodiment, tag file generator 112 generates tag file 106 in real-time or faster. Tag file generation rates may be increased by parallelization of the tag file operation.

Tag file generator 112, stream server 110 and video pump 130 are illustrated as separate functional units for the purpose of explanation. However, the particular division of functionality between units may vary from implementation to implementation. The present invention is not limited to any particular division of functionality. For example, tag file generator 112 is illustrated as a stand-alone unit. However, in one embodiment, tag file generator 112 may be incorporated into an MPEG encoder. Such an MPEG encoder would generate the information contained in tag file 106 simultaneous with the generation of the information contained in MPEG file 104. An implementation that combines the MPEG encoding process with the tag file generation process may increase efficiency by eliminating the need to perform redundant operations. Such efficiency gains are particularly useful when processing audio-visual feeds in real-time.

The tag file 106 contains control information that is used by stream server 110 to implement fast forward, fast rewind, slow forward, slow rewind, pause and seek operations. The use of the tag file 106 to perform these operations shall be described in greater detail below. The tag file 106 contains general information about the MPEG file 104 and specific information about each of the video frames in the MPEG file 104. The tag file 106 may also contain general information about the improved quality video information (e.g., file 148). Prior to discussing in detail the contents of the tag file 106, the general structure of MPEG file 104 shall be described with reference to FIG. 2A.

III. MPEG File Structure

Digital audio-visual storage formats, whether compressed or not, use state machines and packets of various structures. The techniques described herein apply to all such storage formats. While the present invention is not limited to any particular digital audio-visual format, the MPEG-2 transport file structure shall be described for the purposes of illustration.

Figure 2A:
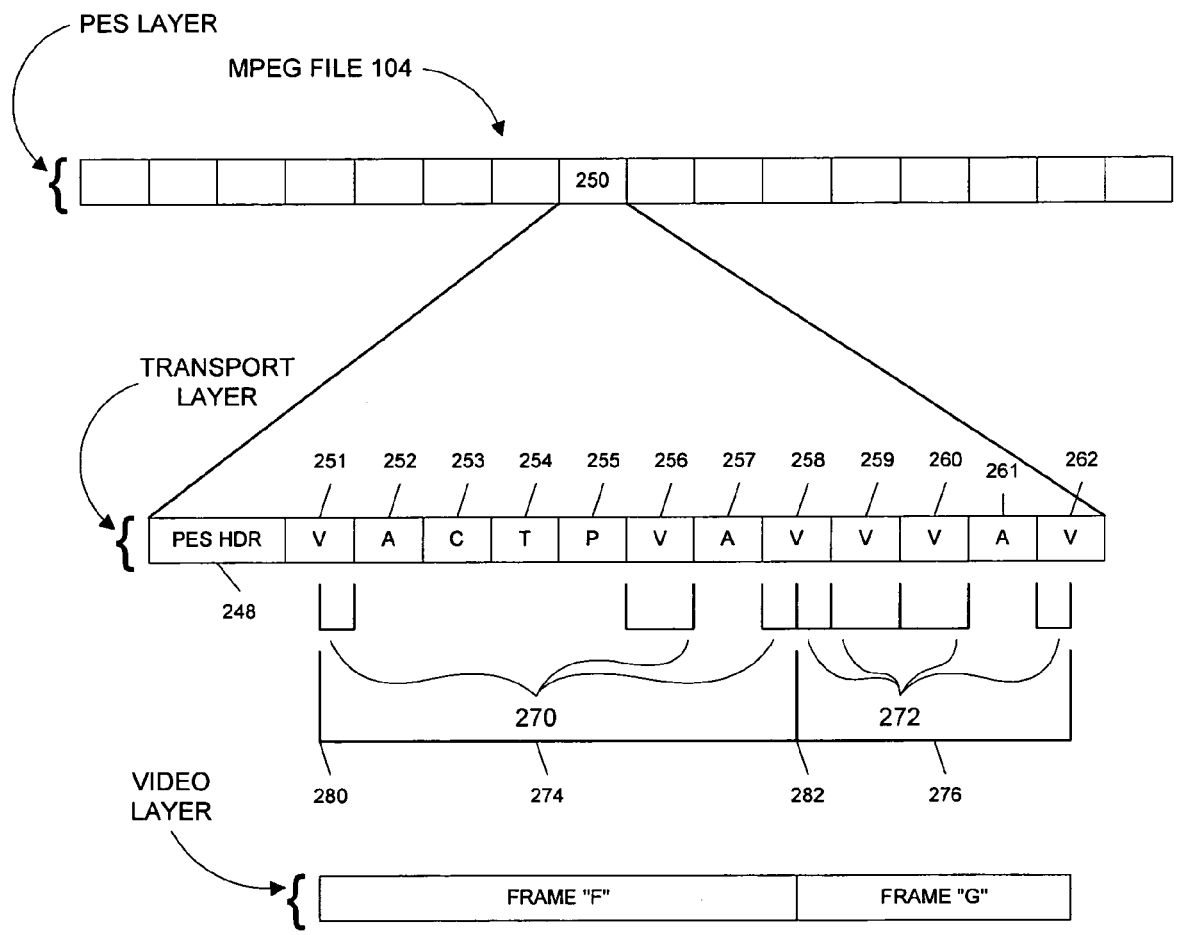
FIG. 2A illustrates the various layers in an MPEG file.

Referring to FIG. 2A, it illustrates the structure of an MPEG-2 transport file 104 in greater detail. The data within MPEG file 104 is packaged into three layers: a program elementary stream ("PES") layer, a transport layer, and a video layer. These layers are described in detail in the MPEG-2 specifications. At the PES layer, MPEG file 104 consists of a sequence of PES packets. At the transport layer, the MPEG file 104 consists of a sequence of transport packets. At the video layer, MPEG file 104 consists of a sequence of picture packets. Each picture packet contains the data for one frame of video.

Each PES packet has a header that identifies the length and contents of the PES packet. In the illustrated example, a PES packet 250 contains a header 248 followed by a sequence of transport packets 251–262. PES packet boundaries coincide with valid transport packet boundaries. Each transport packet contains exclusively one type of data. In the illustrated example, transport packets 251, 256, 258, 259, 260 and 262 contain video data. Transport packets 252, 257 and 261 contain audio data. Transport packet 253 contains control data. Transport packet 254 contains timing data. Transport packet 255 is a padding packet.

Each transport packet has a header. The header includes a program ID ("PID") for the packet. Packets assigned PID 0 are control packets. For example, packet 253 may be assigned PID 0. Other packets, including other control packets, are referenced in the PID 0 packets. Specifically, PID 0 control packets include tables that indicate the packet types of the packets that immediately follow the PID 0 control packets. For all packets which are not PID 0 control packets, the headers contain PIDs which serve as a pointers into the table contained in the PID 0 control packet that most immediately preceded the packets. For example, the type of data contained in a packet with a PID 100 would be determined by inspecting the entry associated with PID 100 in the table of the PID 0 control packet that most recently preceded the packet.

In the video layer, the MPEG file 104 is divided according to the boundaries of frame data. As mentioned above, there in no correlation between the boundaries of the data that represent video frames and the transport packet boundaries. In the illustrated example, the frame data for one video frame "F" is located as indicated by brackets 270. Specifically, the frame data for frame "F" is located from a point 280 within video packet 251 to the end of video packet 251, in video packet 256, and from the beginning of video packet 258 to a point 282 within video packet 258. Therefore, points 280 and 282 represent the boundaries for the picture packet for frame "F". The frame data for a second video frame "G" is located as indicated by brackets 272. The boundaries for the picture packet for frame "G" are indicated by bracket 276.

Structures analogous to those described above for MPEG-2 transport streams also exist in other digital audio-visual storage formats, including MPEG-1, Quicktime, AVI, Indeo, Cinepak, Proshare, H.261 and fractal formats. In one embodiment, indicators of video access points, time stamps, file locations, etc. are stored such that multiple digital audio-visual storage formats can be accessed by the same server to simultaneously serve different clients from a wide variety of storage formats. Preferably, all of the format specific information and techniques are incorporated in the tag generator and the stream server. All of the other elements of the server are format independent.

According to one embodiment, improved quality digital video streams designed for playback at rates other than normal playback rates (e.g., less than 1×) are stored in a second source. For example, in less than 1× playback, since less frames need to be streamed over the same period of time, the quality of the frames may be increased so as to fill the bandwidth, otherwise "reserved" for additional frames, with improved quality video information.

According to another embodiment, a second file format is used to store improved quality digital video information in a second source. The second file format has improved quality video information, but not necessarily any sound. For example, still image file formats such as JPEG, GIF, BMP, TIFF, PIC, MAC or PCD may be used wherein improved quality video information is stored therein. Still image file formats are generally known in the art, and since they do not require any real-time reconstruction by the client device, standard transfer protocols (e.g., TCP/IP) may be used to send the files to the client. Note that additional information may be required by the client device to notify the client of the image's presence, format and unique identity (e.g., time reference to the original streamed information). This will be further described below.

IV. Tag File Contents

Figure 2B:
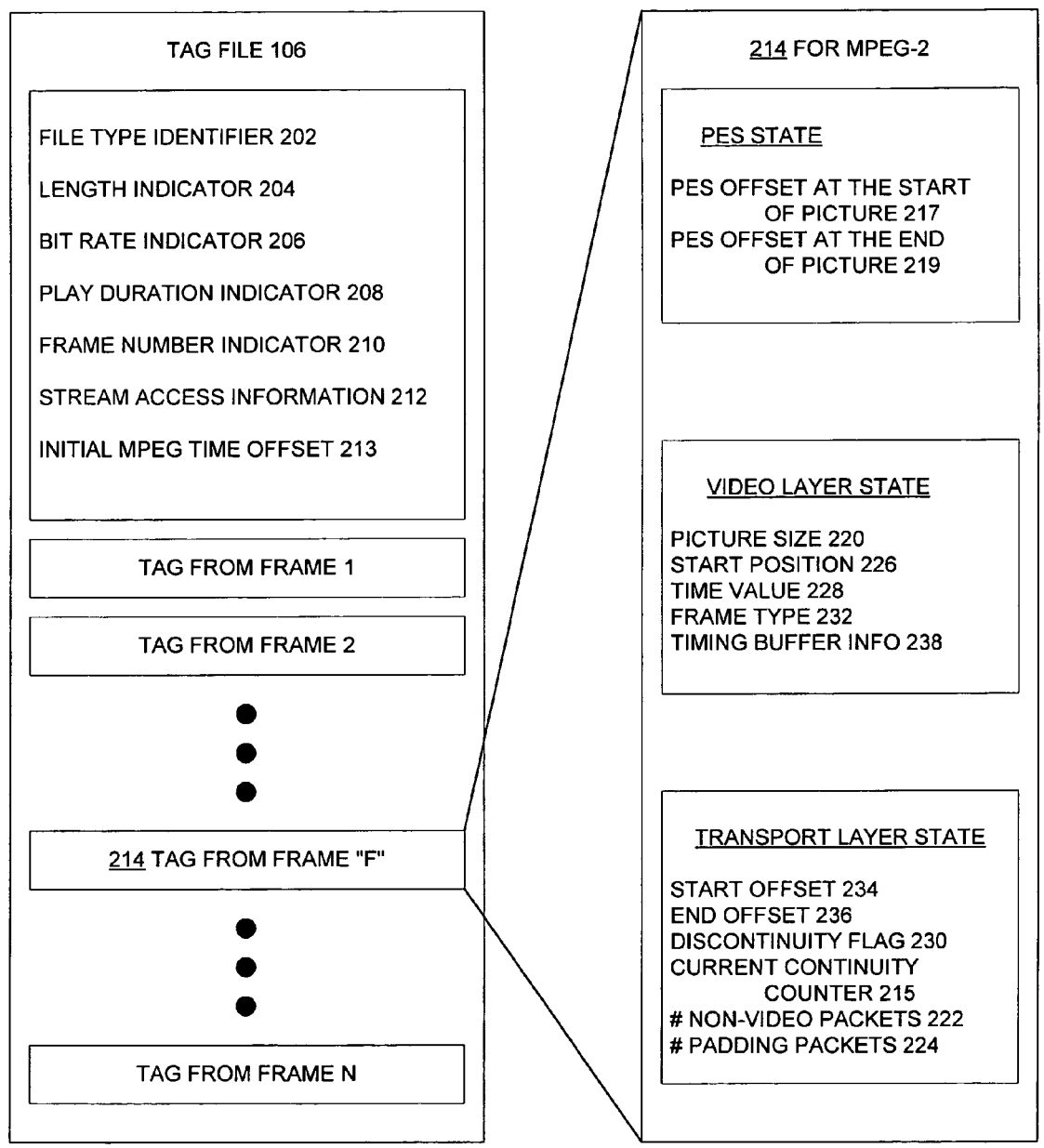
FIGS. 2B and 2C illustrate the contents of a tag file generated according to two embodiments of the invention.

The contents of an exemplary tag file 106 shall now be described with reference to FIG. 2B. In FIG. 2B, the tag file 106 includes a file type identifier 202, a length indicator 204, a bit rate indicator 206, a play duration indicator 208, a frame number indicator 210, stream access information 212 and an initial MPEG time offset 213. File type identifier 202 indicates the physical wrapping on the MPEG file 104. For example, file type identifier 202 would indicate whether MPEG file 104 is a MPEG-2 or an MPEG-1 file.

Length indicator 204 indicates the length of the MPEG file 104. Bit rate indicator 206 indicates the bit rate at which the contents of the MPEG file 104 should be sent to a client during playback. The play duration indicator 208 specifies, in milliseconds, the amount of time required to play back the entire contents of MPEG file 104 during a normal playback operation. Frame number indicator 210 indicates the total number of frames represented in MPEG file 104.

Stream access information 212 is information required to access the video and audio streams stored within MPEG file 104. Stream access information 212 includes a video elementary stream ID and an audio elementary stream ID. For MPEG-2 files, stream access information 212 also includes a video PID and an audio PID. The tag file header may also contain other information that may be used to implement features other than those provided by the present invention.

In addition to the general information described above, the tag file 106 contains an entry for each frame within the MPEG file 104. The entry for a video frame includes information about the state of the various MPEG layers relative to the position of the data that represents the frame. For an MPEG-2 file, each entry includes the state of the MPEG-2 transport state machine, the state of the program elementary stream state machine and the state of the video state machine. For an MPEG-1 file, each entry includes the current state of the Pack system MPEG stream and the state of the video state machine.

Tag file entry 214 illustrates in greater detail the tag information that is stored for an individual MPEG-2 video frame "F". With respect to the state of the program elementary stream state machine, the tag entry 214 includes the information indicated in Table 1.

TABLE 1

| DATA | MEANING |
| --- | --- |
| PES OFFSET AT THE START OF PICTURE 217 | The offset, within the PES packet that contains the frame data for frame "F" of the first byte of the frame data for frame "F". |
| PES OFFSET AT THE END OF PICTURE 219 | The offset between the last byte in the frame data for frame "F" and the end of the PES packet in which the frame data for frame "F" resides. |

With respect to the state of the video state machine, tag entry 214 includes the information indicated in Table 2.

TABLE 2

| DATA | MEANING |
| --- | --- |
| PICTURE SIZE 220 | The size of the picture packet for frame "F". |
| START POSITION 226 | The location within the MPEG file of the first byte of the data that corresponds to frame "F" |
| TIME VALUE 228 | The time, relative to the beginning of the movie, when frame "F" would be displayed during a normal playback of MPEG file 104. |
| FRAME TYPE 232 | The technique used to encode the frame (e.g. I-frame, P-frame or B-frame). |
| TIMING BUFFER INFORMATION 238 | Indicates how full the buffer of the decoder is (sent to the decoder to determine when information should be moved out of the buffer in order to receive newly arriving information). |

With respect to the state of the transport layer state machine, tag entry 214 includes the information indicated in Table 3.

TABLE 3

| DATA | MEANING |
| --- | --- |
| START OFFSET 234 | The distance between the of the first byte in the frame data and the start of the transport packet in which the first byte resides. |
| # OF NON-VIDEO PACKETS 222 | The number of non-video packets (i.e. audio packets, padding packets, control packets and timing packets) that are located within the picture packet for frame "F". |
| # OF PADDING PACKETS 224 | The number of padding packets that are located within the picture packet for frame "F". |
| END OFFSET 236 | The distance between the last byte in the frame data and the end of the packet in which the last byte resides. |
| CURRENT CONTINUITY COUNTER 215 | The Continuity value associated with frame "F". |
| DISCONTINUITY FLAG 230 | Indicates whether there is a discontinuity in time between frame "F" and the frame represented in the previous tag entry. |

Assume, for example, that entry 214 is for the frame "F" of FIG. 2A. The size 220 associated with frame "F" would be the bits encompassed by bracket 274. The number 222 of non-video packets would be five (packets 252, 253, 254, 255 and 257). The number 224 of padding packets would be one (packet 255). The start position 226 would be the distance between the beginning of MPEG file 104 and point 280. The start offset 234 would be the distance between the start of packet 251 and point 280. The end offset 236 would be the distance between point 282 and the end of packet 258.

Figure 2C:
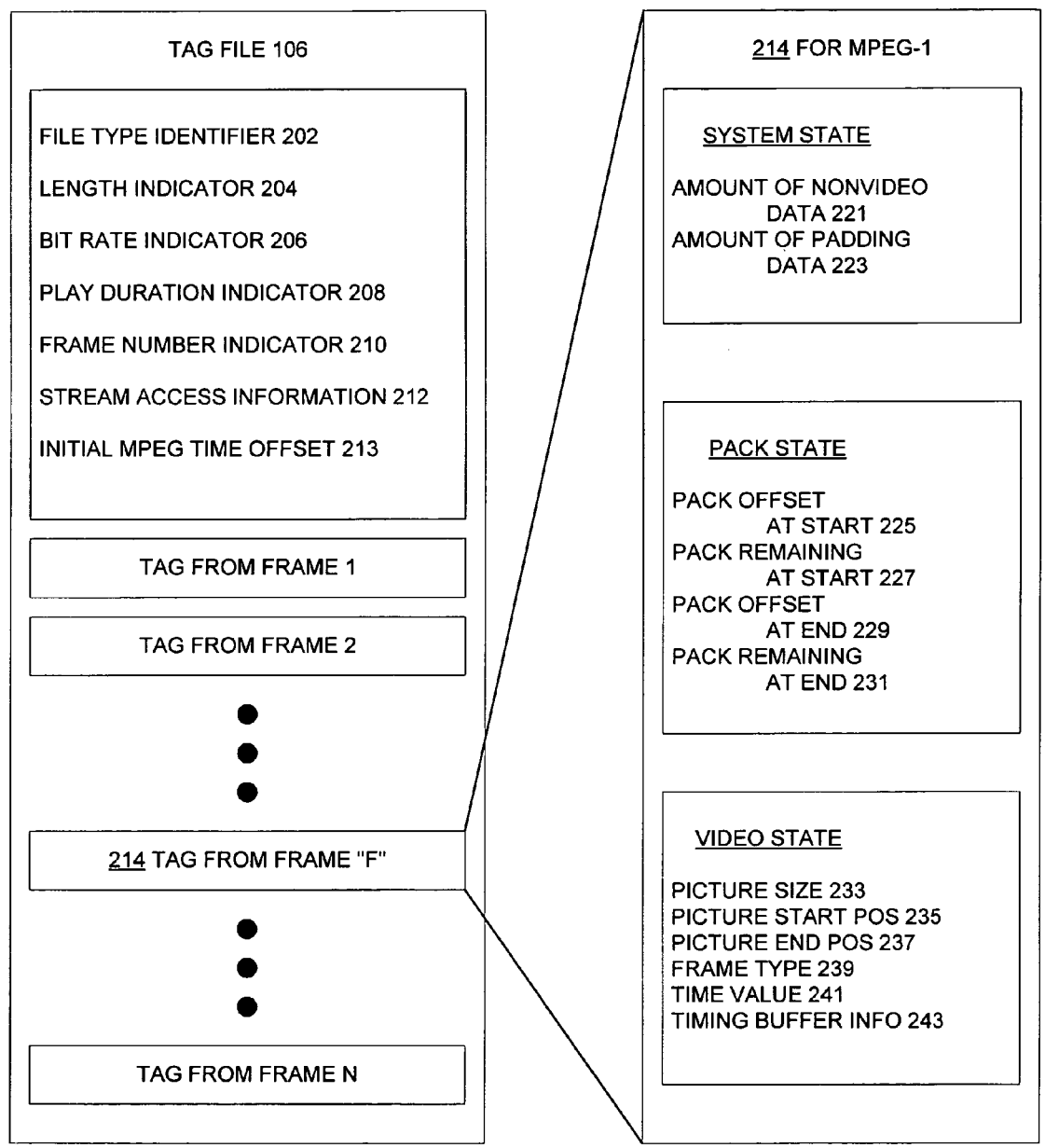

The tag information generated for each frame in an MPEG-1 file is illustrated in FIG. 2C. Referring to FIG. 2C, entry 214 includes data indicating the state of three state machines: a system state machine, a pack state machine, and a video state machine. Specifically, tag entry 214 includes the information shown in Table 4.

TABLE 4

| DATA | MEANING |
| --- | --- |
| AMOUNT OF NON-VIDEO DATA 221 | The amount of non-video data (in bytes) contained within the start and end boundaries of the frame data for frame "F". |
| AMOUNT OF PADDING DATA 223 | The amount of padding data (in bytes) contained within the start and end boundaries of the frame data for frame "F". |
| PACK OFFSET AT START 225 | The offset between the start boundary of the frame data for frame "F" in the beginning of the pack packet that contains the start boundary for frame "F". |
| PACK REMAINING AT START 227 | The distance between the start boundary for frame "F" and the end of the pack packet that contains the start boundary of frame "F". |
| PACK OFFSET AT END 229 | The offset between the end boundary for frame "F" in the beginning of the packet that contains the end boundary for frame "F". |
| PACK REMAINING AT END 231 | The distance between the end boundary for frame "F" and the end of the pack packet that contains the end boundary of frame "F". |
| PICTURE SIZE 233 | The distance (in bytes) between the start boundary for frame "F" and the end boundary for frame "F". |
| PICTURE START POS 235 | The distance between the start of the MPEG-1 file and the start boundary for frame "F". |
| PICTURE END POS 237 | The position, relative to the beginning of the MPEG-1 file, of the end boundary for frame "F". |
| FRAME TYPE 239 | The technique used to encode the data that represents frame "F". |
| TIME VALUE 241 | The time, relative to the beginning of the movie, when frame "F" would be displayed during a normal playback of MPEG file 104. |
| TIMING BUFFER INFO 243 | Indicates how full the decoder is (sent to the decoder to determine when information should be moved out of the buffer in order to receive newly arriving information). |

As explained above with reference to MPEG-1 and MPEG-2 formats, the tag information includes data indicating the state of the relevant state machines at the beginning of video frames. However, the state machines employed by other digital audio-visual formats differ from those described above just as the state machines employed in the MPEG-1 format differ from those employed in MPEG-2. Consequently, the specific tag information stored for each frame of video will vary based on the digital audio-visual format of the file to which it corresponds. According to one embodiment, the tag file 106 is also used in conjunction with the improved quality still image file formats. In this embodiment, the tag file 106 comprises an image type (e.g., frame type 239), an image size (e.g., frame size 233) and the time value 241.

V. Seek Operations

Having explained the contents of tag file 106, the use of tag file 106 to perform seek operations shall now be described. When a client wishes to perform a seek operation, the client transmits a seek operation request to stream server 110. The seek operation request may specify, for example, to jump ahead in the MPEG sequence to a position five minutes ahead of the current playing position. In response to the request, stream server 110 inspects the tag file 106 to determine the I-frame (the "target frame") that would be playing in five minutes if the playback operation proceeded at a normal rate. The target frame may be easily determined by inspecting the time value 228 and frame type 232 information stored in tag file 106.

When the target frame is determined, stream server 110 determines the position within the MPEG file 104 of the frame data that corresponds to the target frame (the "target position"). Stream server 110 performs this determination by reading the start position 226 stored in the entry in tag file 106 that corresponds to the target position. Significantly, all of the operations performed by stream server 110 are performed without the need to access MPEG file 104. This allows for the stream server 110 and the video pump 130 to be distributed among the various servers in the server complex.

For the purpose of explanation, various components of system 100 are said to read data from a particular storage medium. For example, tag file generator 112 and video pump 130 are described as reading data from MPEG file 104 located on mass storage device 140, and stream server 110 is described as reading data from tag file 106 stored on mass storage device 140. However, when data is to be frequently accessed, it is typically cached in a faster, temporary storage medium such as dynamic memory. Rather than read the data directly from the slower storage, the components read the data from the faster temporary storage. In one embodiment, at least a portion of the tag file 106 is stored in a cache memory to reduce the number of disk accesses performed by stream server 110.

Once the target position has been determined, the stream server 110 constructs prefix data for the transition. As mentioned above, prefix data is data that must be inserted into the MPEG data stream prior to a transition to ensure that the MPEG data stream remains MPEG compliant. Prefix data shall be described in greater detail below.

Once stream server 110 constructs the prefix data, stream server 110 transmits commands to video pump 130 to instruct video pump 130 to transition from the current position in the MPEG file to the target position. For a seek operation, the commands generated by stream server 110 will typically include an insert command and a play command. The insert command instructs the video pump 130 to cease transmission of MPEG data from the current position, and to transmit the prefix data. This process effectively "inserts" the prefix data into the MPEG data stream. The play command instructs the video pump 130 to begin transmitting data starting at the target position within the MPEG file 104. The video pump 130 inserts this data in a byte-contiguous way such that the client does not see any boundary between the prefix data, the MPEG data, and the suffix data.

Figure 3A:
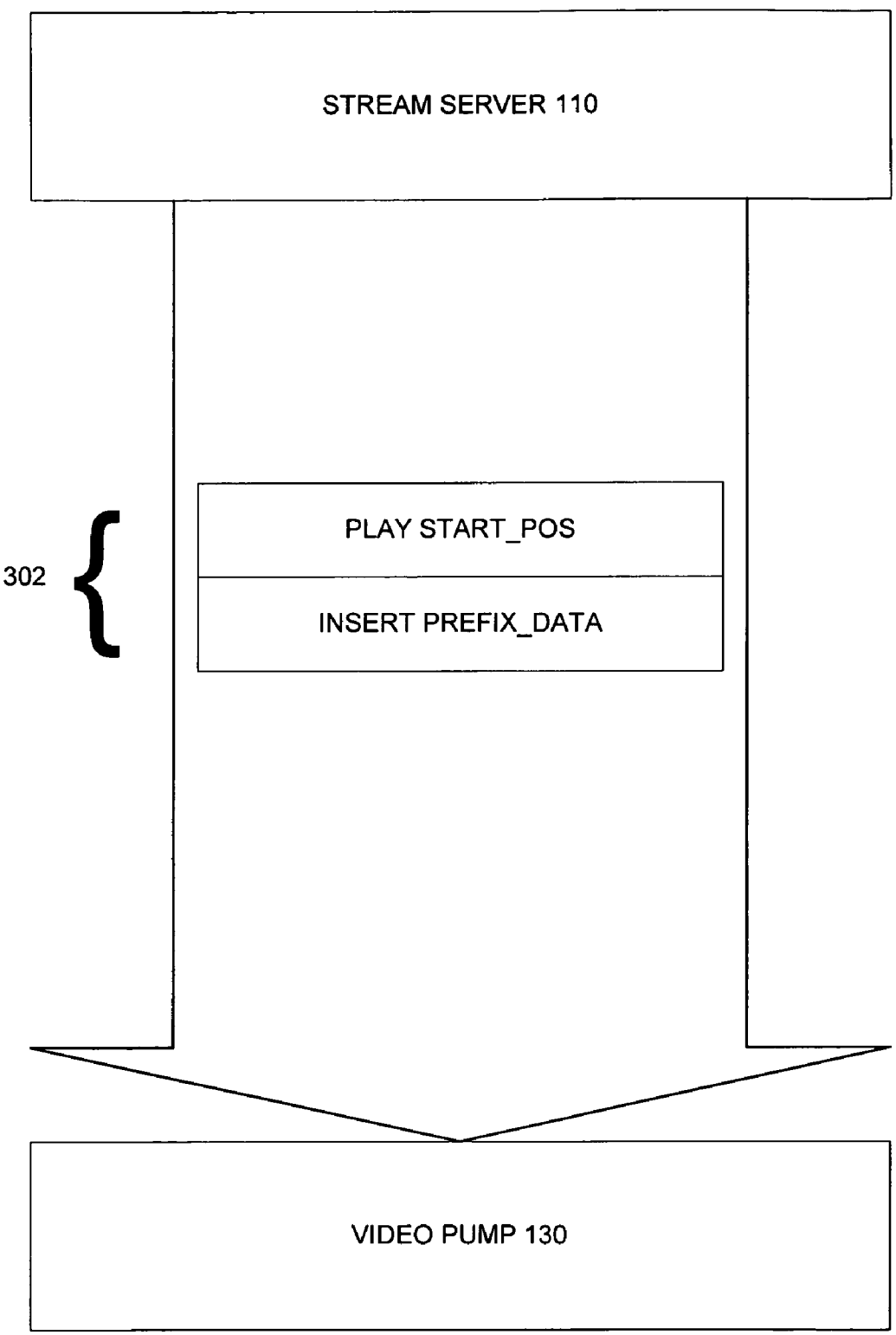
FIG. 3A illustrates the commands sent from the stream server to the video pump in response to a seek request according to an embodiment of the invention.

Referring to FIG. 3A, it illustrates the commands sent by the stream server 110 to the video pump 130 in response to a seek request from a client. In the illustrated example, the stream server 110 transmits two commands 302 to the video pump 130. The first command is an insert command instructing video pump 130 to insert "PREFIX_DATA" into the MPEG data stream that the video pump 130 is sending to a client.

The second command is a play command. The play command instructs the video pump 130 to transmit data beginning at the position "START_POS". START_POS is the position within MPEG file 104 of the first byte of the target frame.

In one embodiment, the "play" instruction supports a "begin position" parameter and an "end position" parameter. In response to a play instruction, the video pump 130 transmits data from the MPEG file beginning at the begin position, and continues to transmit data from the MPEG file until the specified end position is reached. In a seek operation, it is assumed that the playback will continue from the target position to the end of the MPEG file. Therefore, only the begin position parameter of the play command is required for seek operations.

Figure 3B:
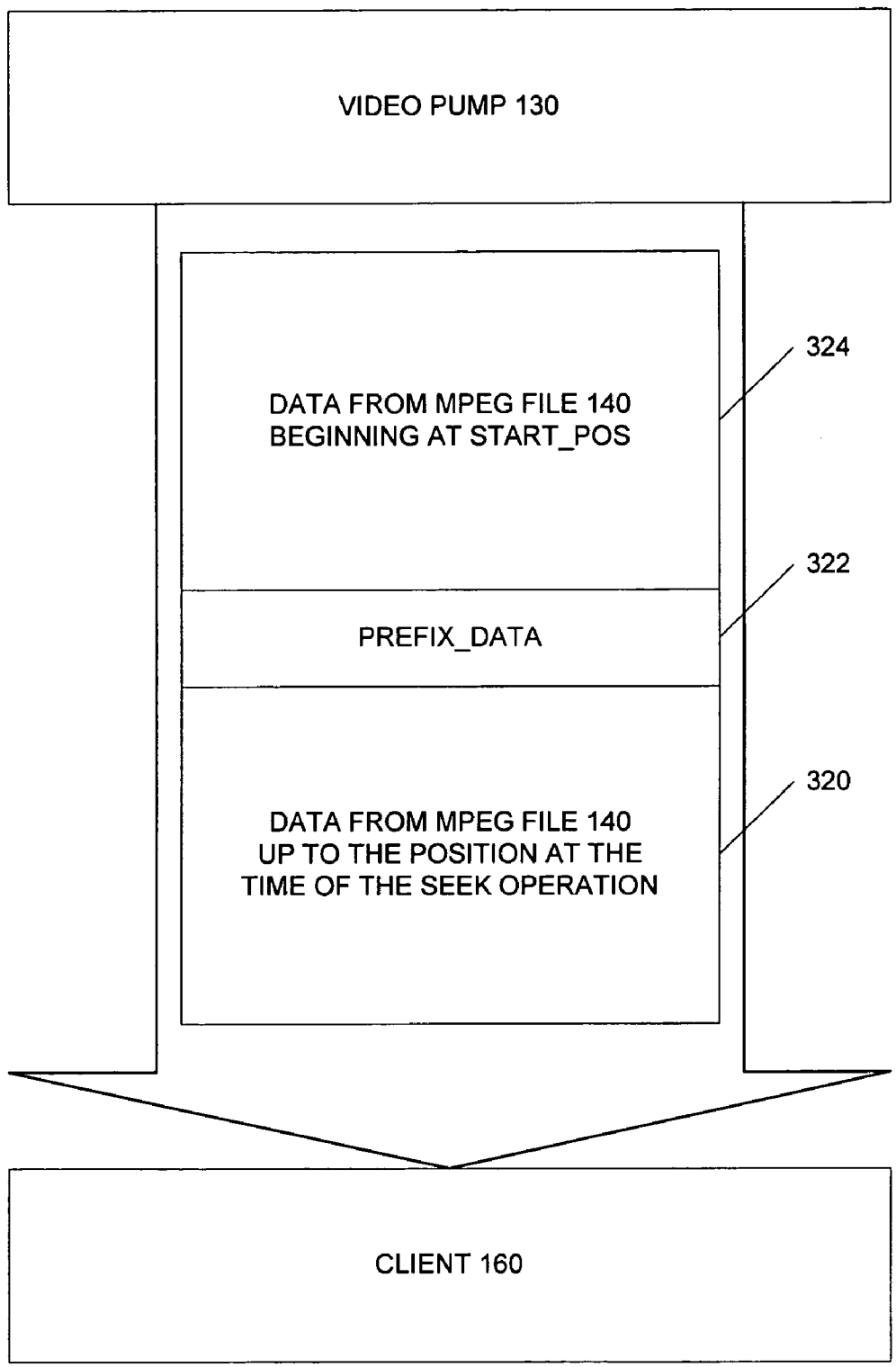
FIG. 3B illustrates the data generated by the video pump to a client in response to the commands illustrated in FIG. 3A.

Referring to FIG. 3B, it illustrates the information sent from video pump 130 to a client (e.g. client 160) in response to the "insert" and "play" commands transmitted by stream server 110. At the time that the video pump 130 receives the insert command, the video pump 130 will be sending MPEG data from some position in the MPEG file (the "current position"). Block 320 represents information transmitted by video pump 130 up to the current position. Upon receiving the insert command, the video pump 130 finishes sending the current transport packet, ceases to transmit data from the current position and transmits the prefix data 322. After transmitting the prefix data 322 to the client, the video pump 130 responds to the play command. Specifically, the video pump 130 begins transmission to the client of data 324 beginning at the target location in the MPEG file.

There is no interruption in the MPEG data stream transmitted by video pump 130 to the client during this process. In addition, the MPEG data stream received by the client fully complies to the MPEG standard. Consequently, the MPEG decoder within the client remains completely unaware that a seek operation was performed. Because seek operations performed by the technique discussed above produce an MPEG compliant data stream, custom MPEG decoders are not required.

According to one embodiment, improved quality video information is used when performing seek operations. For example, if the improved quality video information comprises still image files and a seek operation is called, then the stream server 110 can determine if there is sufficient bandwidth to send the still images to the client. If so, then every Nth image recorded on mass storage device 140 is sent to the client. Details for sending improved quality video information are set forth below.

In still another embodiment, improved quality video streams are used when performing seek operations. In such an embodiment, the stream server 110 determines whether there is sufficient bandwidth to send the improved quality video stream to the client. If so, then the video pump 130 is directed to stream the improved quality video information from a second source.

VI. Prefix Data

As mentioned above, MPEG data is packaged in layers. Clients expect the data stream that they receive from video pump 130 to be packaged in those same layers. If video pump 130 simply jumps from one point in the MPEG file 104 to another point, packaging information will be lost and the clients will not be able to properly decode the data. For example, if video pump 130 simply starts transmitting data from point 280 in FIG. 2A, the PES header 248 for PES packet 250 and the header for transport packet 251 will be skipped. These headers contain data that indicates how to decode the information that follows them. Consequently, without the information contained in these headers, the client will not know how to decode the subsequent data.

Therefore, prefix data must be constructed and sent to smoothly transition between the current location in the MPEG file 104 and a new location. The prefix data contains packaging information that begins packages for the data at the new location. In one embodiment, the prefix data includes the information described in Table 5.

TABLE 5

| DATA | MEANING |
|---|---|
| DISCARD INFORMATION | For MPEG 2: This is a list of PIDs to keep. All other transport packets are discarded. For MPEG 1: This is a list of elementary streams to keep. |
| SYSTEM & PACK HEADER DATA (MPEG-1 ONLY) | Includes a valid system header and a valid Pack Header. |
| TRANSPORT PACKET HEADER DATA (MPEG-2 ONLY) | Includes private data and MPEG video header data, described below. |
| PRIVATE DATA | Includes a private time stamp and other data described below. |
| VIDEO INITIALIZATION DATA | Includes an MPEG sequence header which indicates frames per second and horizontal and vertical resolutions. |
| POSSIBLE EXTRA PADDING AND SECOND TRANSPORT PACKET HEADER (MPEG-2 ONLY) | Explained below. |
| MPEG VIDEO HEADER | MPEG-2: Includes a valid PES header, a video presentation time and, under certain conditions, discontinuity data which causes the client's clock to be reset. MPEG-1: Contains a valid picture header. |

With respect to the discard information, assume that the target video frame of a seek operation is the video frame located between points 280 and 282 in FIG. 2A. The discard information contained in the insert command generated in response to the seek operation may instruct video pump 130 to discard all of the non-video packets located between points 280 and 282. According to one embodiment, the packets are identified by their PID numbers.

With respect to private data, the mechanism used to convey this data differs between MPEG-1 and MPEG-2. For MPEG-1, private data is sent in a pack packet on the ISO/IEC private data-1 stream. (See section 2.4.4.2 of ISO 11172-1 for more information). For MPEG-2, private data is sent in a packet on the video PID, but in a section of the adaptation field titled private data. (See section 2.4.3.4 of ISO/IEC 13818-1 for more information).

Since clients may desire specific information about the operation in progress (seek, fast forward, rewind, frame advance or rewind) which cannot be encoded in the file's digital audio-visual storage format, private data is used. When the server knows that "client specific" information is needed, it places it into whatever private data mechanism is supported by the file's audio-visual storage format. Thus, the output to the network maintains its conformance to the required format. This is necessary in case the network is performing checks to be sure that data is not corrupted in transmission. By virtue of being in private data, the "client specific" data will not be checked.

With respect to the possible extra padding, since transport packets have a fixed size in MPEG-2, an extra padding packet is required when the prefix data is too large to fit into the same packet as the first block of video data. For example, assume that point 280 is ten bytes from the beginning of video packet 251. If the prefix data required to transition to point 280 is greater than ten bytes, then the prefix data will not fit in the same packet as the first block of video data. Under such circumstances, the prefix data is sent in a transport packet that is completed with padding. A second transport packet is constructed to transmit the video data located between point 280 and the end of video packet 251. The first ten bytes in this second transport packet are filled with padding.

Since MPEG-1 has variable size packets, this issue for MPEG-1 does not arise. Rather, a correct packet size for the prefix data is simply computed.

According to one embodiment of the present invention, additional information is required when dynamically switching to an improved quality video information source. For example, a signal to the client that the next packet of data is not an MPEG packet, but is rather a packet or file for a still image or an improved quality video stream may be needed. This information may be implied based upon the client's last command to the server, or it may be explicitly provided by the stream server 110 or the video pump 130.

VII. Packet Discontinuities

In the original MPEG file 104, each packet has an associated time stamp. Typically, the time stamps of packets sequentially located within MPEG file 104 will be sequential too. During playback operations, the client tracks the time stamps to determine the integrity of the MPEG data stream. If two sequentially-received packets do not have sequential time stamps, then the client determines that a discontinuity has occurred. If the difference between two sequentially-received time stamps is small, then the client can usually compensate for the discontinuity. However, if the difference between two sequentially-received time stamps is too great, the client may reset itself or initiate some other type of recovery operation.

When a seek operation is performed, the client will sequentially receive packets that are not sequentially located within the MPEG file 104. Because the packets are not sequentially located within MPEG file 104, the time stamps associated with the packets will not be sequential. If the jump specified by the seek operation is relatively large, then the discontinuity between the time stamps may be sufficient to cause the client to terminate normal playback. To avoid this situation, data which causes the client to reset its clock is included in the prefix data. Upon receipt of such data, the client simply resets its clock based on the time stamp contained in the following packet.

As noted above, the time stamps of packets sequentially located within an MPEG file will typically be sequential. However, it is possible to have sequentially stored packets that do not have sequential time stamps. If a large discontinuity occurs between packets in the original MPEG file, then the original MPEG file will itself contain data which causes the client's clock to reset. Stream server 110 inspects the discontinuity flags 230 in tag file 106 to determine whether a particular seek operation will skip any packets which contain data to reset the client's clock. If the seek operation skips over any discontinuous packets, then data that causes the client's clock to reset is added to the prefix data.

Though in concept the same operation is performed in MPEG-1 and MPEG-2, the mechanism by which the operation is performed differs because of the different timing mechanisms used in MPEG-1 and 2. Specifically, in the MPEG-1 embodiment, the "System Clock Reference" (SCR) is the clock used (see Section 2.4.2 of ISO/IEC 11172-1).

In the MPEG-2 embodiment, the "Program Clock Reference" (PCR) and "Presentation Time Stamp" (PTS) are both used. See sections 2.4.2.1 and 2.4.3.6 of ISO/IEC 13818-1 respectively for definitions of the PCR and PTS.

Although the file formats referenced above typically necessitate a sequence identifier so that discontinuities may be detected, still image file formats used in one embodiment of the present invention do not. However, data that causes the client's clock to reset may be sent in addition to the still image to reset the clock without disabling the ability to detect a discontinuity.

VIII. Buffer Limitations

The MPEG decoder in each client has a buffer of a certain limited size. Typically the buffer must be large enough to hold information from two sequential frames of video. Consequently, the data for the later frame of video may be written into the buffer at the same time that the data for the previous frame of video is being read out of the buffer by the decoder.

In many clients, the size of the buffer is selected based on the assumption that the incoming MPEG data stream will never contain two sequentially-ordered large I-frames of video data. During normal playback from an MPEG-compliant file, this assumption will hold true, since P and B-frames will occur between successive I-frames. However, seek operations may cause a jump from a large I-frame located at a first location in the MPEG file 104 to a second I-frame located at a second location in the MPEG file 104. If an attempt is made to write the second I-frame into the buffer before the first I-frame has been entirely read from the buffer, the decoder may lose synchronization or otherwise fail. Stream server 110 detects when a seek operation would cause such an overflow by inspecting the timing buffer information 238 stored in the tag file 106.

To avoid such buffer overflow, the stream server 110 inserts data into the prefix data that will cause the arrival of the second large I-frame to the decoder buffer to be delayed. While the second I-frame is delayed, the client has time to complete the processing of the first I-frame. By the time the data for the second I-frame begins to arrive, the first I-frame has been completely processed so that the portion of the buffer used to hold the previous I-frame is available to hold the second I-frame.

According to one embodiment, the second I-frame is delayed by placing a delayed time stamp in transport packet header portion of the prefix data. The transport packet header portion of the prefix data serves as the header for the packet that contains the beginning of the second I-frame (the "transition packet"). The transition packet is received by a network buffer that feeds the decoder buffer. The network buffer determines when to send the video information contained in the transition packet to the decoder buffer based on the time stamp in the transition packet. Because the time stamp indicates a delay between the transition packet and the previous packet, the network buffer delays the transfer of the video information from the transition packet into the decoder buffer.

According to an alternate embodiment, the second I-frame is delayed by adding padding packets to the prefix data prior to the data that serves as the heading for the transition packet. Such padding packets will arrive at the client prior to the transition packet. As the client receives and discards the padding packets, the first I-frame is being read from the decoder buffer. By the time all of the padding packets have been processed, the first I-frame has been completely read out of the decoder buffer and the decoder buffer is ready to receive the second I-frame.

IX. Specified-Rate Playback Operations

Most video cassette recorders allow viewers to watch analog-based audio-visual works at playback speeds other than normal 1× forward playback. For example, some video cassette recorders provide multiple rates of fast forward, slow forward, slow rewind and fast rewind. The present invention provides similar functionality to the viewers of MPEG-encoded works. In one embodiment, the functionality of typical video cassette recorders is surpassed in that any speed of forward and rewind playback is supported. For example, a viewer could select 1000× fast forward or fast rewind, or 0.0001× slow forward or slow rewind.

According to one embodiment, the processes used to implement fast forward, slow forward, slow rewind and fast rewind operations include the same general steps. Therefore, for the purpose of explanation, these steps shall be described with reference to a fast forward operation. After the fast forward process is explained, it shall be described how and when slow motion and rewind operations differ from fast forward operations.

To initiate a fast forward operation, a client transmits a fast forward request to the stream server 110. In embodiments that support more than one fast forward rate, the fast forward request includes data designating a presentation rate. As used herein, "presentation rate" refers to the rate at which the audio-visual work is presented to a viewer.

The stream server 110 receives the fast forward request from the client and, in response to the request, inspects the information contained in tag file 106. Specifically, stream server 110 determines from the information in tag file 106 which frames should be displayed to produce the specified presentation rate. The frame selection process performed by stream server 110 must take into account various constraints that will be described in greater detail below.

Figure 8:
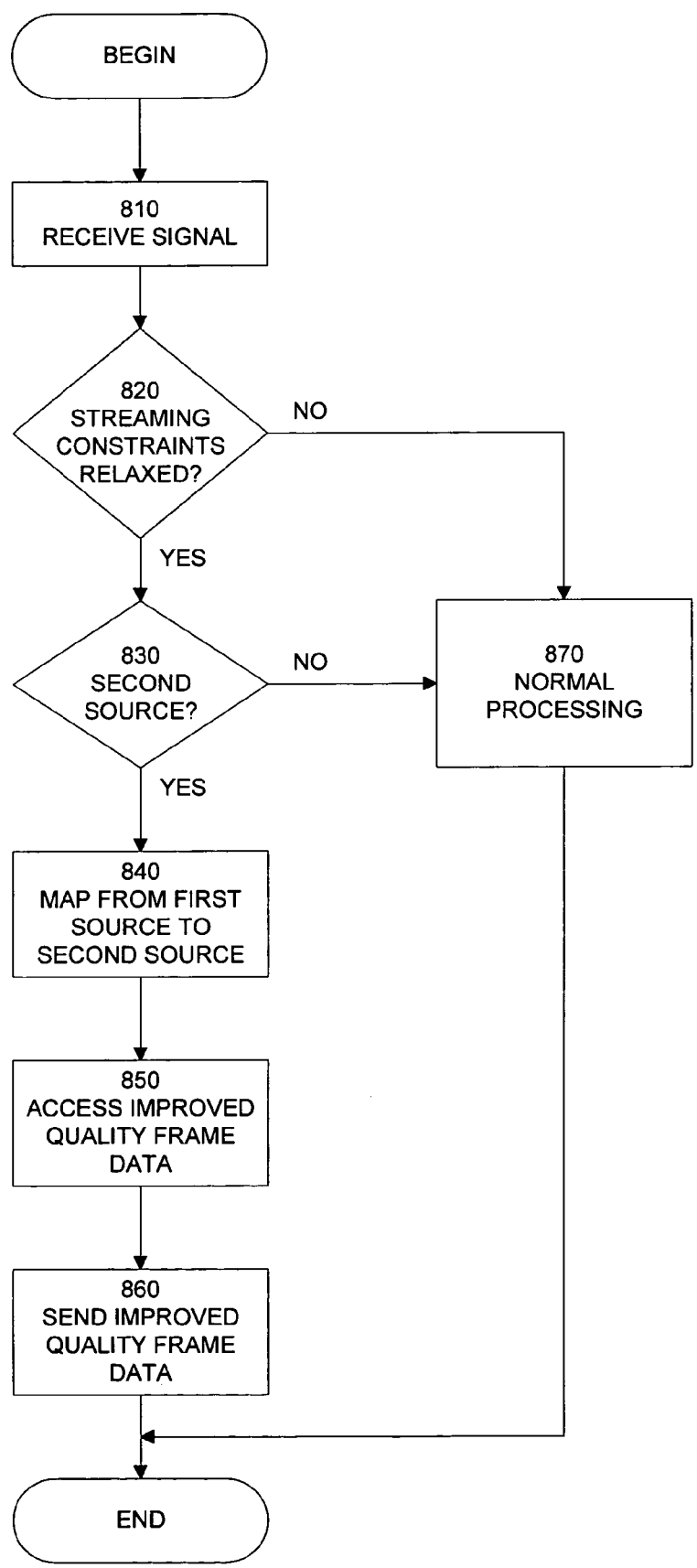
FIG. 8 is a flow chart illustrating the steps of dynamic quality adjustment according to an embodiment of the invention.

According to one embodiment, the frame selection process includes dynamically adjusting the quality of the digital video information streamed to a client. FIG. 8, described in detail below, is a flowchart depicting the steps of dynamic quality adjustment in response to changing streaming constraints according to one embodiment.

In step 810 the stream server 110 receives a signal from a client. The stream server 110 inspects the signal and then, in step 820, determines whether a command in the signal would result in a relaxation of the streaming constraints relative to the present streaming constraints. For example, the stream server 110 may have allocated the client a 10K bits per second channel over which an audio-visual stream was streamed and all of the bit rate was utilized. Now, as a result of a command from the client, the bit rate required is only 5K bits per second. Consequently, 5K bits per second of the bit rate are not being used, thus indicating a relaxation of the streaming constraints.

As a result of testing in step 820, if the streaming constraints have been relaxed, then the stream server 110 determines in step 830 whether a second source (e.g., disk 148 or file 148) is available from which to stream or send improved quality video information. In one embodiment, the stream server 110 tests storage device 140 to determine if a set of still images is available that, if sent to the client at the desired presentation rate, would use no more than the bit rate previously allocated to the client and the quality of the resulting video frame would be improved. In another embodiment, the stream server 110 tests storage device 140 to determine if there is an improved quality video stream (e.g., an MPEG stream) available that, if sent to the client at the desired (or approximately the desired) presentation rate, would use no more than the bit rate previously allocated to the client. If there is a second source, then a transformation is performed in step 840 that maps the last frame sent to the client device before the signal was received by the server to the improved quality frame data on the second source. In one embodiment, if an improved quality video stream is used (e.g., an MPEG stream), then the transformation is made so that the nearest I-frame is selected for playback and playback will begin at the selected I-frame.

Once the transformation is complete, the stream server 110 notifies the video pump 130 of the improved quality frame data and in step 850 the improved quality frame data is accessed by the video pump 130. Next, in step 860, the video pump 130 sends the improved quality frame data to the client device.

According to one embodiment, the improved quality frame data is sent with additional information to facilitate processing. For example, the additional information may comprise a reference time so that an inverse transformation or mapping may be performed between the second source and the first source when a normal presentation rate is resumed. When still images are used, the additional information may comprise a delay that is inserted between a first still image sent to the client and a subsequent still image sent to the client. By inserting a delay, the system may protect against buffer overflows on the client device.

If, in response to testing at step 820, the streaming constraints are not relaxed, or in response to testing at step 830, the second source is not available, then normal processing/streaming, described in further detail herein, is resumed in step 870.

X. Bit Budgeting

The simplest method for selecting frames during a fast forward operation would be to select every Nth frame, where N is the specified presentation rate relative to normal presentation rate. For example, assume that the client requests a 5× fast forward operation. In response to such a request, stream server 110 could select every fifth frame for display. Stream server 110 would then transmit a series of play commands to video pump 130 to cause video pump 130 to transmit an MPEG data stream that contains data for every fifth frame. Thus, the presentation rate would be 5×.

The simple frame selection process described above could work if all of the frames in the MPEG file 104 were encoded in I-frame format and if either all I-frames were the same size or the bandwidth of network 150 was unlimited. However, the bandwidth of network 150 is not unlimited, I-frames do not all have the same size and, as explained above, MPEG files also include frames encoded in P-frame and B-frame formats which cannot be decoded independent of information from other frames.

The bandwidth between video pump 130 and its clients is limited. For example, video pump 130 may be allocated a 1.5 or 2 megabits per second channel for each MPEG data stream it transmits to a client. To determine whether selection of a particular frame (the "frame at issue") will exceed the available bandwidth, stream server 110 determines the size of the time window that will be available to send the particular frame. The size of the time window is equal to (T2−T1)/PR, where T1 is the time value associated with the previously selected frame, T2 is the time value associated with the frame at issue, and PR is the current presentation rate. For example, assume that the time associated with previously selected frame is one second away from the time of the frame at issue. Assume also that the presentation rate is 10×. Therefore, the time window for sending the frame at issue would be (1 second)/10 or 0.1 seconds.

Once the stream server 110 determines the time window available to send the data for the frame at issue, the stream server 110 determines the current "bit budget" by multiplying the time window by the data transfer rate of the channel through which the MPEG data stream is being sent to the client. For example, if the applicable data transfer rate is 2M bits per second and the time window is 0.1 seconds, then the current bit budget is 200K bits. The stream server 110 then reads the frame size from the tag information to determine if the frame at issue falls within the current bit budget. If the size of the frame at issue exceeds the current bit budget, then the frame at issue is not selected. This is the case, for example, if the size of the frame data for the frame at issue is 50K bytes (400K bits) and the bit budget is 200K bits. Otherwise, if the frame at issue falls within the bit budget, then the frame at issue is selected to be sent. If a particular frame is not sent, then it is more likely that a future frame will be sent, because of the unused time space (and thus bits in the bit budget) of the unused frames.

According to one embodiment, the process described above will work well with the still image implementation provided a sufficient number of still images are available. In such an implementation, the time difference between still images may need to be considered when selecting the number N, since bandwidth is limited and the improved quality frame data may not be available for every frame in a corresponding MPEG stream. Of course, if pause or freeze frame functionality is desired, then successive stills are not sent since the frame does not need to be reconstructed to create a frame (the image is the frame with stills).

XI. Frame-Type Constraints

As explained above, an MPEG frame cannot be accurately recreated from P-frame data unless the preceding I-frame has been decoded. A frame cannot be accurately recreated from B-frame data unless the preceding and succeeding P or I-frame data is decoded. Consequently, stream server 110 is limited with respect to which frames it can select.

Assuming that the bandwidth is available, any I-frame can be selected. According to one embodiment of the invention, only I-frames are even considered for selection. Stream server 110 accesses the tag information to determine the frame type of the frame at issue. If the frame at issue is not an I-frame, then it is automatically skipped, and stream server 110 moves on to evaluate the subsequent frame. At some playback rates, this technique may result in unused bandwidth. That is, the transmission of every I-frame will require less bandwidth than is available. Therefore, stream server 110 transmits insert commands to cause video pump 130 to transmit MPEG padding between the transmission of I-frame information. In one embodiment, the padding packets are sent as one component of suffix data, which shall be described in greater detail below.

According to one embodiment, P and B-frames are not automatically skipped in the frame selection process. Rather, P and B-frames are considered for selection unless information that they require has already been skipped. Specifically, if any I-frame is not selected by stream server 110, then the frames that fall between the skipped I-frame and the subsequent I-frame are skipped. In addition, if any P-frame is not selected, then the B and P-frames that fall between the skipped P-frame and the subsequent I-frame are skipped. Based on these rules, any additional bandwidth available between the transmission of I-frames may be filled with P-frame and B-frame data. As a result, the resulting MPEG data stream will have more frames per second.

According to yet another embodiment, stream server 110 is programmed to skip some I-frames even when the bandwidth is available to send them. For example, stream server 110 may skip every fifth I-frame that otherwise qualifies for selection. Because I-frames are significantly larger than P and B-frames, numerous P and B frames may be sent in the bandwidth made available by skipping a single I-frame. Consequently, the resulting MPEG data stream has more frames per second than it would otherwise have if all qualifying I-frames were selected.

In one embodiment, a client may specify parameters for the selection process performed by stream server 110. For example, the client may request more frames per second. In response, the stream server 110 transmits more P and B frames in the MPEG data stream by increasing the number of qualifying I-frames that it skips. On the other hand, the client may request a more continuous picture. In response, the stream server 110 transmits a higher percentage of qualifying I-frames, leaving less bandwidth for transmitting P and B-frames.

XII. Suffix Data

While the stream server 110 is selecting the frames to be displayed during a fast forward operation, the stream server 110 is simultaneously transmitting commands to the video pump 130 to cause the video pump 130 to send an MPEG video stream containing the frames that have already been selected. The portion of the MPEG data stream used to convey data for a selected frame is referred to herein as a "segment". To maintain compliance with the MPEG standards, segments include prefix data that is sent prior to transmitting the frame data for the selected video frames. The process of generating prefix data was described above with reference to seek operations.

Performing a fast forward operation is similar to performing a series of seek operations in which each seek operation causes the video pump 130 to jump to the data for the next selected frame. Specifically, for each selected frame, the stream server 110 must generate prefix data, transmit an insert command to the video pump 130 to cause the video pump 130 to insert the prefix data into the data stream, and transmit a play command to the video pump 130 to cause the video pump 130 to transmit data from the appropriate frame.

Fast forward operations differ from seek operations in that the play command specifies an end position as well as a beginning position. The end position is the location within the MPEG file 104 of the last byte of the frame data for the selected frame. For example, assume that the frame boundaries for a selected frame F are points 280 and 282 illustrated in FIG. 2A. The stream server 110 would send video pump 130 an insert command to cause video pump 130 to send prefix data to the client, and a play command to cause video pump 130 to send the video data located between points 280 and 282 to the client.

Typically, the end position (e.g. point 282) specified in the play command will not coincide with a packet boundary. Therefore, to maintain MPEG compliance, additional information ("suffix data") must be inserted into the data stream after the transmission of the frame data. The suffix data includes padding which completes the transport packet that contains the end of the selected frame. For example, the suffix data that would be inserted into the data stream after sending the frame F would contain a length of padding equal to the distance between point 282 and the end of video packet 258. Under certain conditions, the suffix data also includes padding packets. As shall be described hereafter, the number of padding packets sent in the suffix data depends on the size of the frame data, the presentation rate, the minimum padding rate and the number of padding packets that were left inside the frame data. Thus, a segment consists of prefix data, the frame data of a selected frame, and suffix data.

Figure 4A:
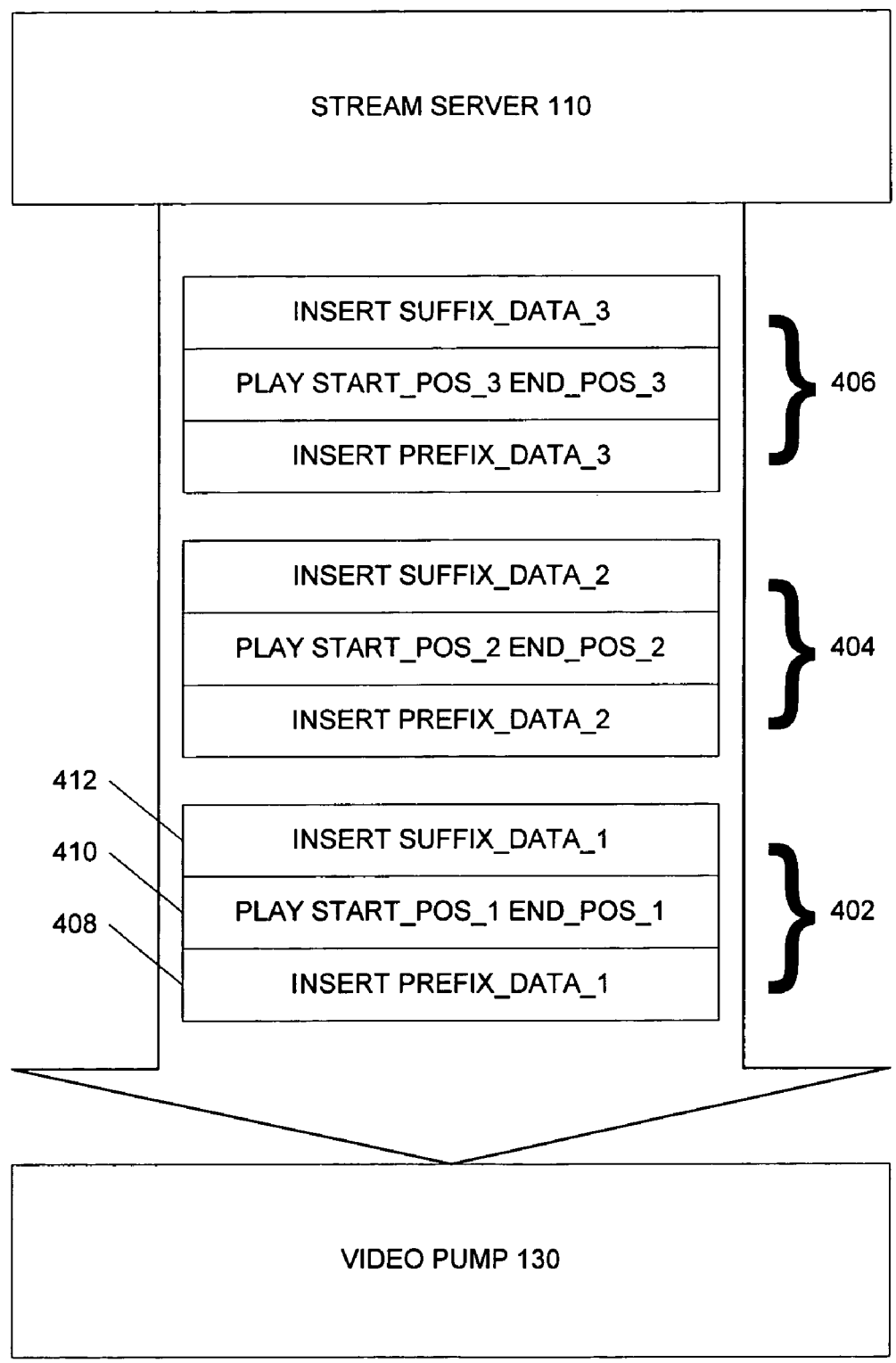
FIG. 4A illustrates the commands sent from the stream server to the video pump during a rate-specified playback operation according to one embodiment of the invention.

The stream server 110 generates the suffix data and transmits an insert command to the video pump 130 to cause the video pump to insert the suffix data into the MPEG data stream. Consequently, during a fast forward operation, the commands sent by the stream server 110 to the video pump 130 appear as illustrated in FIG. 4A. Referring to FIG. 4A, stream server 110 has thus far selected three frames to be displayed: frame_1, frame_2 and frame_3. Upon selecting frame_1, stream server 110 transmits three commands 402 to the video pump 130. The three commands 402 include a first insert command 408, a play command 410 and a second insert command 412.

The first insert command 408 instructs video pump 130 to transmit prefix data "PREFIX_DATA_1" to a client. The play command 410 instructs video pump 130 to transmit the data located between the positions START_POS_1 and END_POS_1 to the client. In the illustrated example, START_POS_1 would be the position of the first byte of frame_1, and END_POS_1 would be the position of the last byte of frame_1. The second insert command 412 instructs the video pump 130 to transmit suffix data "SUFFIX_DATA_1" to the client. The data that is specified by these three commands constitutes a segment for frame_1.

As explained above, many transport packets may be required to store the frame data for a single video frame (e.g. frame_1). Other packets that do not contain video information, such as padding packets, timing packets and audio packets, may be interspersed between the video packets for the video frame. In one embodiment, stream server 110 not only transmits the boundaries of each frame to video pump 130, but stream server 110 also indicates what to do with the non-video packets within those boundaries. Typically, the audio packets will be discarded. However, the other non-video packets may or may not be retained based on various factors. For example, to sustain the minimum padding rate stream server 110 may indicate that the padding packets are to be maintained. The value of maintaining a minimum padding rate shall be discussed in greater detail below.

Video pump 130 receives this information from stream server 110 and strips from the MPEG data stream those non-video packets indicated by the stream server 110. Consequently, the information sent by video pump 130 in response to play command 410 will typically include less than all of the data located between START_POS_1 and START_POS_2.

Referring again to FIG. 4A, stream server 110 has transmitted three commands 404 to cause video pump 130 to transmit a segment for frame_2, and three commands 406 to cause video pump 130 to transmit a segment for frame_3. Stream server 110 will continue to transmit commands in this manner to cause video pump 130 to transmit segments for every frame that it selects to be displayed during the fast forward operation.

Figure 4B:
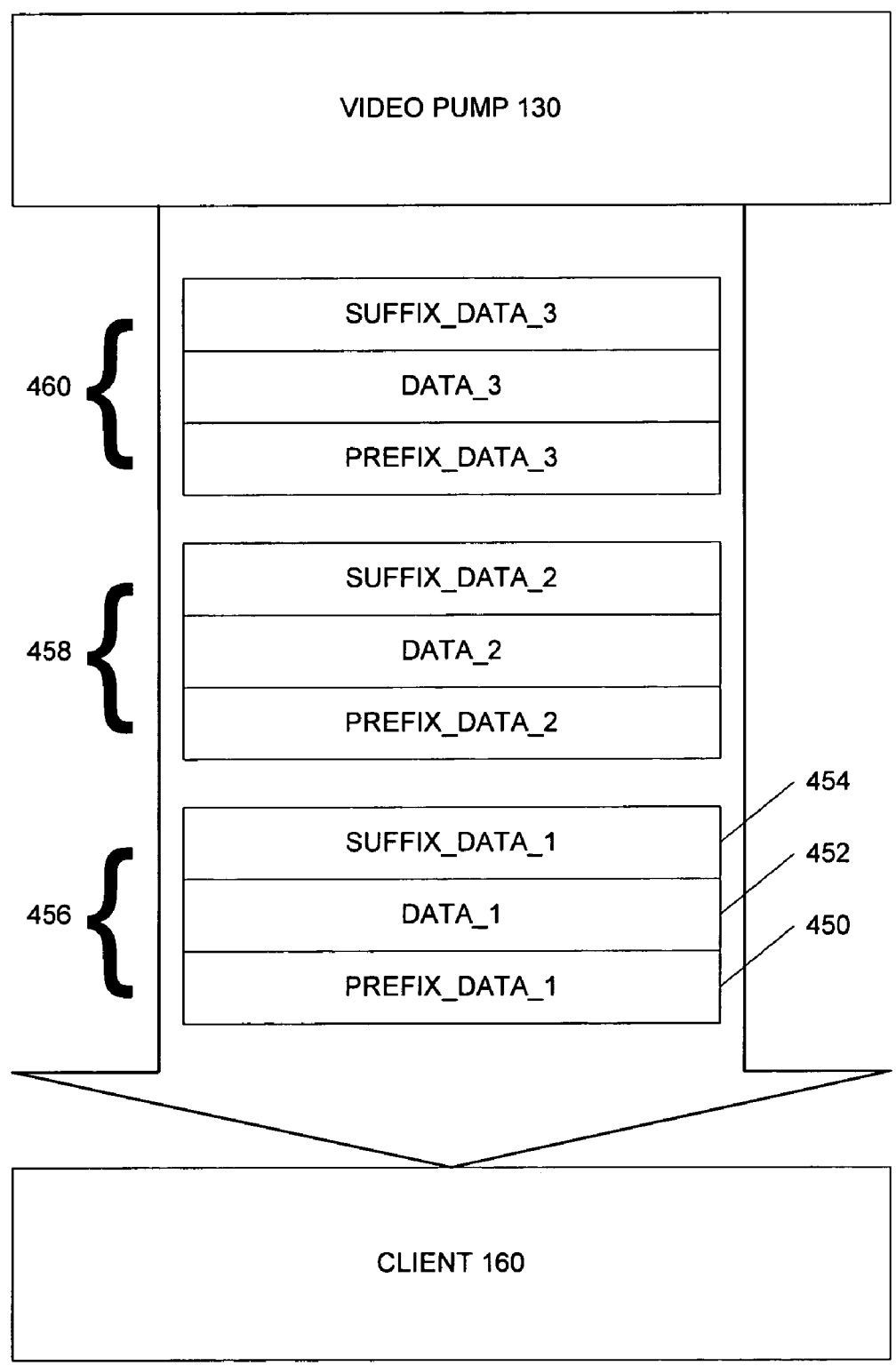
FIG. 4B illustrates the data generated by the video pump to a client in response to the commands illustrated in FIG. 4A.

Referring to FIG. 4B, it illustrates the data transmitted by video pump 130 in response to the commands described above. Specifically, in response to the first insert command 408, video pump 130 transmits PREFIX_DATA_1 450 to the client 160. In response to play command 410, video pump 130 transmits the data located between START_POS_1 and END_POS_1. This data, illustrated as DATA_1 452, contains the frame data of frame_1. In response to the second insert command 412, video pump 130 transmits SUFFIX_DATA_1 to the client 160. The segment consisting of PREFIX_DATA_1, DATA_1 and SUFFIX_DATA_1 conveys the frame data of frame_1 to client 160 while maintaining compliance with the MPEG standards.

In one embodiment, these commands between the stream server 110 and video pump 130 are sent over a very fast lightweight network or through shared memory. For a typical stream, supporting 15 frames-per second of fast forward, 45 commands per second shall be sent thus stressing communications inside the server. In one embodiment, the commands are sent from the stream server 110 to the video pump 130 in batches.

XIII. Slow Motion Operations

As explained above, frames are selectively skipped for playback operations that exceed normal playback speed. For playback operations that are slower than normal playback speed, no frames are skipped. Rather, stream server 110 selects every frame. As in fast forward operations, the video pump 130 transmits segments for each of the selected frames in response to commands generated by stream server 110. The suffix data in the segments include padding packets which delay the arrival of the subsequent segments. Consequently, the frame data arrives and is decoded at a slower rate than during normal playback operations. Alternatively, the time delays may be imposed by causing the stream server 110 to insert delayed time stamps into the prefix data that it sends to the video pump 130.

According to one embodiment, rather than inserting a delay and spooling from the same MEG file, the server switches to the second source having improved quality video information (stills or streams). The delay may not be necessary, since the increased amount of data that is sent at the same bit rate may necessarily result in a delay. Alternatively, delays may be inserted, as before, which create an even slower presentation rate.

XIV. Freeze Frame Operations

According to one embodiment, freeze frame, or pause operations are performed in the same manner as the slow motion operation described above and depicted in FIG. 8.

However, no delays are needed and, according to one embodiment, an improved quality still image is retrieved and sent to the client.

XV. Rewind Operations

Rewind operations are performed in the same manner as fast and slow forward operations with the exception that only I-frames are selected for rewind operations (regardless of whether the rewind operations are fast or slow). P and B frames are automatically skipped because they cannot be decoded unless frames that precede them in the original MPEG file are processed before them. However, during rewind operations, the frames on which P and B frames depend will be processed after the P and B frames that depend on them.

The concept of "multistream" fast forward or rewind has been mentioned above. Multistream fast forward or rewind is accomplished by storing multiple copies of the movie, where the copies have been recorded at various rates.

In one embodiment, when a client requests a certain fast forward or rewind presentation rate, the stream server 110 will determine whether it has a prerecorded file at that rate. If so, it will play that file. This will give the user more frames per second and will also cause less computational and communication load on the stream server 110 and video pump 130. However, if the requested rate is not available, the stream server 110 will determine the best file from which to choose individual frames, and will process that file as described above. The best file will be the file that has the most I-frames to select from at the requested presentation rate.

This integration of "multi-stream" and "single-stream" fast forward and rewind thus allows servers to choose between any level of quality, disk storage requirements, and server computational and communication load, providing significant advantage over the use of multi-stream operations alone.

According to another embodiment, a set of improved quality still image files are used and consecutively selected still images are sent to the client.

XVI. Runtime Communication

In one embodiment, stream server 110 is configured to receive and transmit responses to queries made by clients while video pump 130 is transmitting an MPEG data stream to the clients. The stream server 110 conveys the responses to the queries to the client by causing video pump 130 to insert the responses into the MPEG data stream that is being sent to the client. This process is complicated by the fact that the communication channel between video pump 130 and each client is completely filled by the MPEG data stream that the video pump 130 is sending.

However, some packets in the MPEG data stream are merely padding, and do not contribute to the resulting audio-visual display. To take advantage of the bandwidth occupied by these padding packets, the stream server 110 causes video pump 130 to replace these padding packets with data packets that contain responses to the queries. When the data packets arrive at the client, the MPEG decoder in the client determines that the data packets do not contain audio-visual data and passes the data packets to a higher level application. The higher level application inspects the data packets and extracts from the data packets any information contained therein.

During fast forward and fast rewind operations, the ability of the stream server 110 to communicate with the client in this manner would be lost if the frame selection process did not leave room for padding packets that may be replaced with data packets. Therefore, in one embodiment of the invention, the stream server 110 selects frames in such a way as to ensure some available minimum padding rate. If selection of a frame would cause the padding rate to fall below the specified minimum rate, then the frame is skipped. The stream server 110 also tells the video pump 130 where to put the requisite padding.

According to one embodiment, the video pump 130 does not replace padding packets with data packets, but actually generates the padding packets. The MPEG data stream transmitted by the video pump 130 passes through a downstream manager 131 prior to arriving at the client. The downstream manager replaces the padding packets with data packets that contain the responses generated by stream server 110. Because the MPEG data stream maintains a minimum level of padding, the downstream manager is guaranteed a minimum bandwidth for placing data packets into the MPEG data stream.

XVII. Frame Accurate Positioning

For many uses, it is important to be able to determine exactly which frame is being displayed by the client at any given time. For example, a user may wish to pause the playback of an MPEG movie, select an item on the screen, and select a menu option that places an order for the item over the network. If the currently displayed frame is not accurately identified, then the wrong item may be ordered.

During normal movie play, frame accurate positioning is encoded as part of the normal MPEG data stream. Specifically, time stamps are interleaved with the frame data in the MPEG data stream. Hardware in the client extracts this timing information. Typically, numerous frames follow each time stamp. Therefore, the client uniquely identifies the currently displayed frame based on the last timing information and the number of frames that have been processed since receipt of the last timing information.

During fast forward and fast rewind, the identity of frames cannot be determined by the timing information contained in the MPEG data stream. For example, the third frame after a particular time stamp may be one of any number of frames depending on the current playback rate and frame selection technique. Consequently, to provide frame accurate positioning, the stream server 110 is configured to insert a time stamp in front of every frame transmitted in the MPEG data stream. Video pump 130 receives the time stamp information from the stream server 110, which retrieves the time stamp from the tag file 106.

Many clients are not able to decode more than a certain number of time stamps per second because the MPEG specification does not require them to decode more than a certain amount of time stamps per second. Therefore, in one embodiment, the time stamp inserted before each frame is not an MPEG time stamp. Rather, the time stamps are placed in packets that are tagged as MPEG "private data packets". When a client receives a private data packet, it determines whether it recognizes the data in the packet. Clients that do not support private data time stamps simply discard the private data packets containing the time stamps and thus will not be able to do perfect frame accurate positioning. Such clients will still be able to perform approximate frame positioning based on the MPEG time stamps that are coincidentally included in the MPEG data stream. Clients that support private data time stamps extract the time stamps from the private data packets and thus can exactly determine the identity of the frames that follow the time stamps.

According to one embodiment, the still file implementation uses a time stamp associated with each frame too, since the viewer or client will likely want to return to a previous presentation rate and a value to map between the two sources of video information may be needed. In an alternative embodiment, the time stamp corresponding to the last frame presented at the previous presentation is stored in memory and is retrieved once a signal to stop sending improved quality frame data is received.

XVIII. Mapping Between Sources

When a signal is received that ultimately requires video pump 130 to retrieve improved quality video information from a second source, the stream server 110 transforms, or maps a present frame from the first source to a corresponding set of improved quality video information from the second source. According to one embodiment, this operation is accomplished with a transformation function.

For example, if a first frame was associated with a point-in-time of exactly one hour (e.g., time value 241 corresponds to exactly one hour), then a corresponding point-in-time in the improved quality video information source must be located. Using a transform, the point-in-time in the first corresponds linearly to a location in the second source (e.g., point-in-time A corresponds to location B by the function F(A)=[multiplier]*A+[constant]=B). However, a linear correspondence is unlikely when mapping between compressed sources. In another embodiment, the point-in-time in the first source is mapped to the second source by traversing a B-tree type, or other type of index that points directly to the location in the second source.

In another embodiment, tag file 106 associated with the video stream has a pointer to a corresponding improved quality video information (e.g., a still image file or another video stream). The pointer in tag file 106 is used to explicitly map from the first source to the second source having improved quality video information stored thereon.

XIX. Disk Access Constraints

Figure 7:
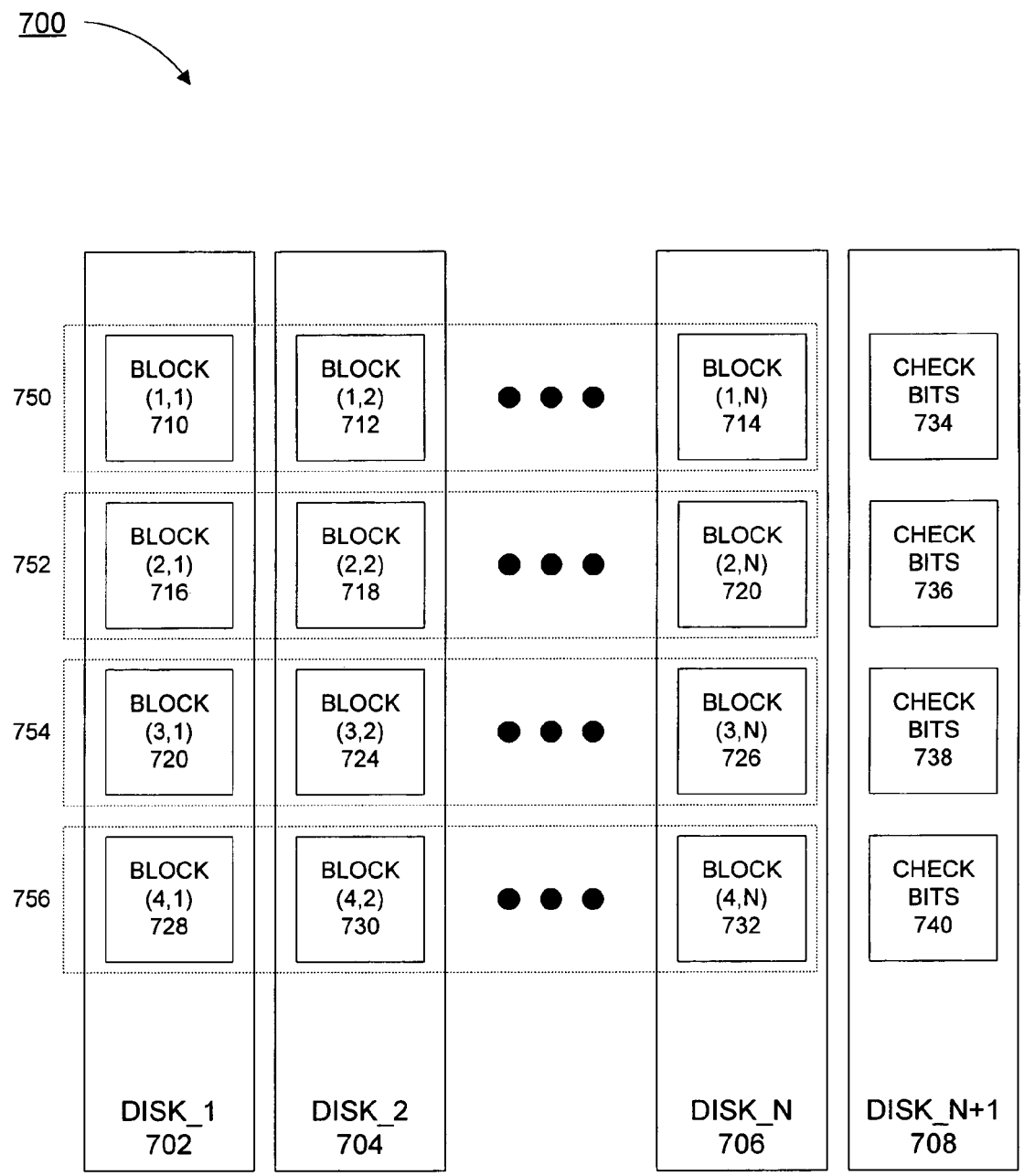
FIG. 7 is a block diagram illustrating a multi-disk MPEG playback system according to an embodiment of the invention.

In some video playback systems, a single MPEG file may be stored across numerous disk drives to increase the fault tolerance of the system. Consider, for example, the multi-disk system 700 illustrated in FIG. 7. System 700 includes N+1 disk drives. An MPEG file is stored on N of the N+1 disks. The MPEG file is divided into sections 750, 752, 754 and 756. Each section is divided into N blocks, where N is the number of disks that will be used to store the MPEG file. Each disk stores one block from a given section.

In the illustrated example, the first section 750 of the MPEG file includes blocks 710, 712 and 714 stored on disks 702, 704 and 706, respectively. The second section 752 includes blocks 716, 718 and 720 stored on disks 702, 704 and 706, respectively. The third section 754 includes blocks 722, 724 and 726 stored on disks 702, 704 and 706, respectively. The fourth section 756 includes blocks 728, 730 and 732 stored on disks 702, 704 and 706, respectively.

The disk 708 which is not used to store the MPEG file is used to store check bits. Each set of check bits corresponds to a section of the MPEG file and is constructed based on the various blocks that belong to the corresponding section. For example, check bits 734 corresponds to section 750 and is generated by performing an exclusive OR operation on all of the blocks in the first section 750. Similarly, check bits 736, 738 and 740 are the products of an exclusive OR performed on all of the blocks in the section 752, 754 and 756, respectively.

System 700 has a higher fault tolerance than a single disk system in that if any disk in the system ceases to operate correctly, the contents of the bad disk can be reconstructed based on the contents of the remaining disks. For example, if disk 704 ceases to function, the contents of block 712 can be reconstructed based on the remaining blocks in section 750 and the check bits 734 associated with section 750. Similarly, block 718 can be constructed based on the remaining blocks in section 752 and the check bits 736 associated with section 752. This error detection and correction technique is generally known as "Redundant Array of Inexpensive Disks" or RAID.

During real-time playback using RAID, a video pump reads and processes the MPEG file on a section by section basis so that all of the information is available to reconstruct any faulty data read from disk. During normal playback operations, there is sufficient time to perform the disk accesses required to read an entire section while the data from the previous section is being transmitted in the MPEG data stream. However, during fast forward and fast rewind operations, less than all of the data in any section will be sent in the MPEG data stream. Because less data is sent, the transmission of the data will take less time. Consequently, less time will be available to read and process the subsequent section.

For example, assume that only one frame X from section 750 was selected for display during a fast forward operation. During the time it takes to transmit the segment for frame X, the data for the next selected frame Y must be read and processed. Assume that the next frame Y is located in section 752. If the MPEG file is read and processed on a section by section basis (required for RAID), then all of the blocks in section 752 must be read and processed during the transmission of the single frame X. Even if it were possible to read and process all of the blocks in section 752 in the allotted time, it may still be undesirable to do so because of the resources that would be consumed in performing the requisite disk accesses.

In light of the foregoing, video pump 130 does not use RAID during fast forward and fast rewind operations. Rather, video pump 130 reads, processes and transmits only the data indicated in the commands it receives from the stream server 110. Thus, in the example given above, only the frame data for frame Y would be read and processed during the transmission of the segment for frame X. By bypassing RAID during fast forward and fast rewind operations, disk bandwidth remains at the same level or below that used during normal playback operations.

Since RAID is not used during real-time fast forward and fast rewind operations, faulty data cannot be reconstructed during these operations. Consequently, when the video pump 130 detects that the data for a selected frame is corrupted or unavailable, the video pump 130 discards the entire segment associated with the problem frame. Thus, if the data associated with a frame cannot be sent, then the prefix and suffix data for the frame is not sent either. However, any padding packets that were to be sent along with the prefix or suffix data will still be sent.

By sending data in entire "segments", conformance with the digital audio-visual format is maintained. In one embodiment, the video pump 130 will send down padding packets to fill the line to maintain the correct presentation rate. In another embodiment, this behavior is selectable by the client.

XX. Variable Rate Playback Operations

As mentioned above, a client may change the presentation rate of the audio-visual work by transmitting a rate change request to the stream server 110. Typically, clients issue change rate requests in response to input received from a user. For example, a user may press a fast forward button on a remote control. The remote control transmits a signal that identifies the button that was pressed. The client receives and decodes the signal transmitted by the remote control to determine that the fast forward button was requested. The client then transmits a change rate request to the stream server 110 that specifies some presentation rate greater than 1×.

According to one embodiment of the invention, the client is configured to detect if the user continues to hold down the fast forward button. If the user holds down the fast forward button for more than a predetermined interval, then the client transmits a second change rate request that designates a faster presentation rate than the previously requested presentation rate. While the user continues to hold down the fast forward button, the presentation rate is continuously increased. Another button, such as the rewind button, may be pressed to incrementally decrease the presentation rate.

The process described above appears to the user as a variable rate fast forward operation. However, to the stream server 110, the operation actually consists of a series of distinct fast forward operations. This incremental rate adjustment process has been described with reference to fast forward operations. However, it may equally be applied to slow forward, slow rewind and fast rewind operations. Further, rate changes may be performed in response to the how many times a particular button is pressed rather than or in addition to how long the button is pressed. In addition, a visual indication of the current presentation rate, such as an arrow that has a length that reflects the presentation rate, may be displayed on the screen while the presentation rate does not equal 1×.

XXI. Non-Interactive Digital Audio-Visual Editing

By initiating seek operations and rate-specified playback operations, a user is effectively performing interactive MPEG editing. That is, the MPEG data stream that is produced in response to these operations is based on but differs from the content of the original MPEG file. In addition to such interactive presentation of content, the present invention provides a mechanism for non-interactive MPEG editing. During non-interactive MPEG editing, an MPEG file is produced which is based on but differs from one or more pre-existing MPEG files. The mechanism for non-interactive MPEG editing shall now be described with reference to FIGS. 5 and 6.

Figure 5:
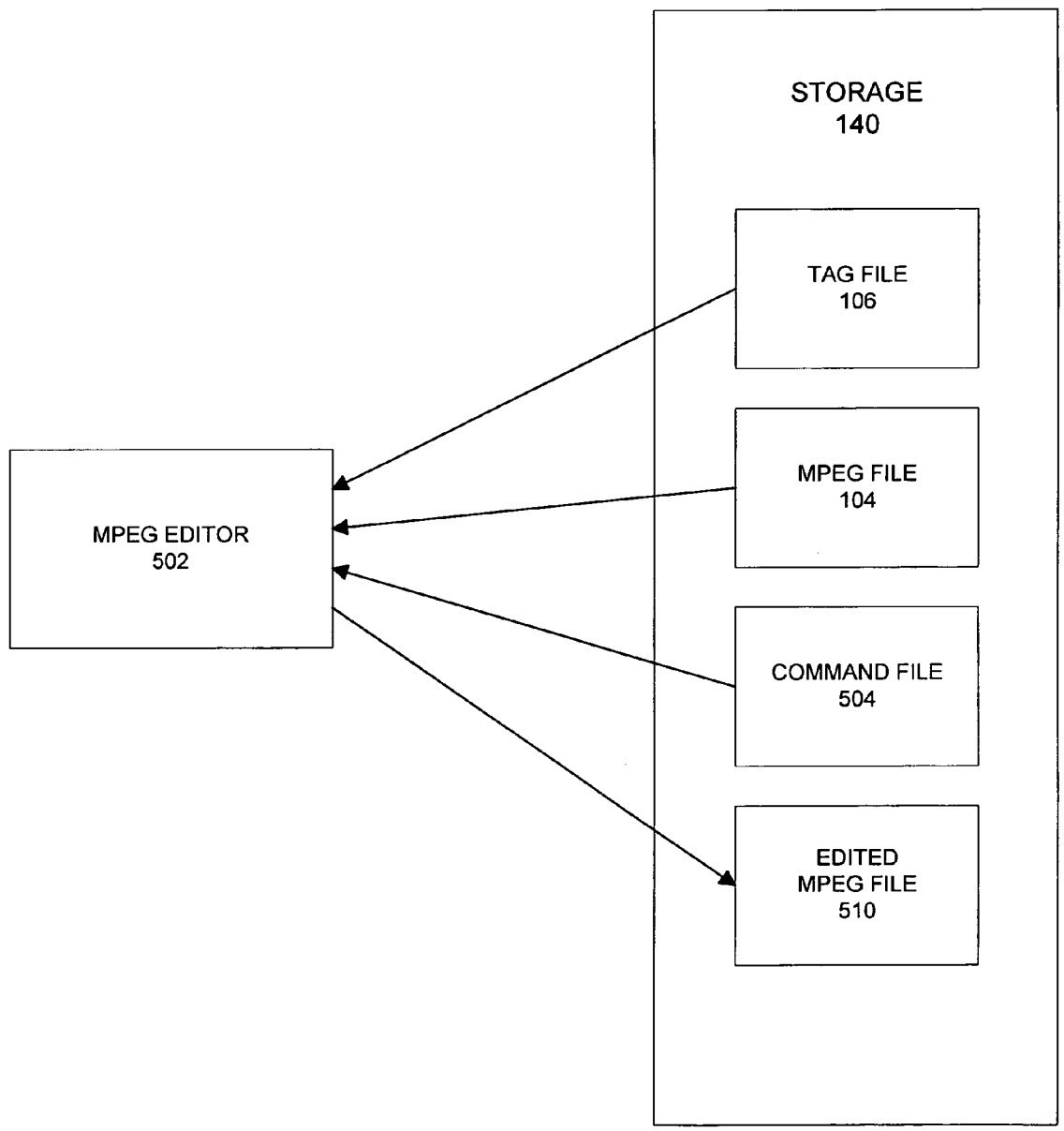
FIG. 5 illustrates an MPEG editor configured to perform non-interactive MPEG editing according to an embodiment of the invention.

Referring to FIG. 5, an MPEG editor 502 is provided for generating new MPEG sequences based on pre-existing MPEG content. According to one embodiment, the MPEG editor 502 reads a command file 504 containing editing commands. The commands contained in the command file 504 include parameters for specifying "splices" from pre-existing MPEG files. For example, each of the commands in command file 504 may have the following format:

"filename" [start_pos] [end_pos] [presentation_rate]

In this exemplary command, the "filename" parameter represents a pre-existing MPEG file. The remaining parameters specify a splice from the specified MPEG file. Specifically, the start_pos parameter represents the position within the specified MPEG file at which to begin the splice. If no start_pos is designated, it may be assumed that the splice is to begin at the first frame of the specified MPEG file. The end_pos parameter represents the position at which to end the splice. If no end_pos is designated, it may be assumed that the splice is to end at the end of the specified MPEG file. The presentation_rate represents the presentation rate of the splice relative to the original MPEG file. If no presentation rate is specified, then a normal (i.e., 1×) presentation rate is assumed.

In one embodiment, the start_pos and end_pos parameters are specified in terms of time because timing information is typically more accessible to a user than file position information. For example, a user may want to specify a two minute splice that begins ten minutes into a particular MPEG movie and ends twelve minutes into the MPEG movie. The user typically will not know the file position of the first byte in the frame that is displayed ten minutes into the movie, or the last byte in the frame that is displayed twelve minutes into the movie. As shall be explained hereafter, the MPEG editor 502 determines file positions that correspond to the specified times by inspecting the tag information for the specified MPEG file.

Figure 6:
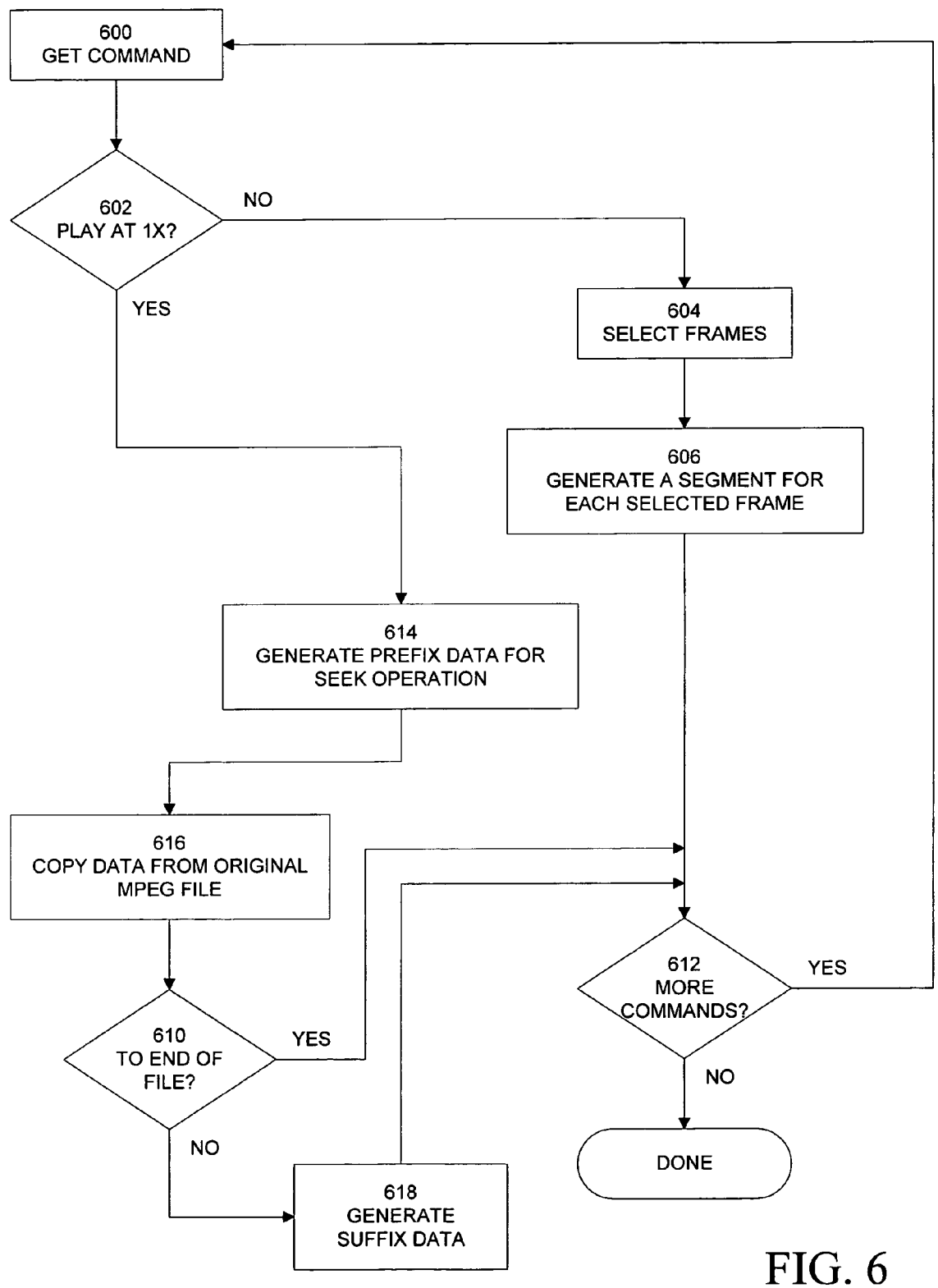
FIG. 6 is a flow chart illustrating the operation of the MPEG editor of FIG. 5 according to an embodiment of the invention.

The operation of MPEG editor 502 shall now be described with reference to FIG. 6. At step 600, the MPEG editor 502 reads a command in the command file 504. Preferably the commands are read in the same sequence as they appear in the command file 504. Therefore, MPEG editor 502 will read the first command in command file 504 the first time that step 600 is performed.

At step 602, the MPEG editor 502 determines whether the command specified a 1× presentation rate. If a presentation rate other than 1× was specified, then control passes to step 604. Steps 604 and 606 are analogous to the steps performed by stream server 110 and video pump 130 during a specified-rate playback operation. Specifically, at step 604 MPEG editor 502 selects frames in the specified MPEG file that fall within the specified time period (start_pos to end_pos). Frames are selected based on the specified presentation rate and the tag information according to the selection process described in detail above. Once the frames are selected, segments are generated (step 606) which package the frame data corresponding to the selected frames in MPEG-compliant packets. These segments are stored in sequence to produce a portion of an edited MPEG file 510. Control then passes to step 612, which either causes the next command to be processed or the editing operation to end if there are no more commands to be processed.

If a 1× presentation rate was specified, then control passes from step 602 to step 614. At steps 614 and 616, MPEG editor 502 performs an operation analogous to the seek operation described above. Specifically, MPEG editor 502 compares the specified starting position with the time stamp information contained in the tag file 106 to determine the position of a target frame. MPEG editor 502 then generates prefix data (step 614) to perform the transition to the specified frame. After generating the prefix data, MPEG editor 502 copies data from the specified MPEG file into the edited MPEG file 510 beginning at the start of the target frame (step 616).

Once the data between start_pos and end_pos has been copied into edited MPEG file 510, MPEG editor 502 determines whether the splice terminated at the end of the specified MPEG file (step 610). If the splice terminated at the end of the specified MPEG file, then the splice ended on a packet boundary. Otherwise, suffix data is generated (step 618) to complete the current packet (step 618). Control then passes to step 612, which either causes the next command to be processed or the editing operation to end if there are no more commands to be processed.

When all of the commands in the command file 504 have been processed by MPEG editor 502, the edited MPEG file 510 will be an MPEG compliant file containing the splices specified by the commands in the command file 504. Significantly, the edited MPEG file 510 was generated without having to perform additional analog-to-MPEG encoding. Further, editing may be performed even if one does not have access to any of the analog versions of the original works. By generating MPEG files in this manner, a user may quickly create unique and original movies based on preexisting MPEG content.

Typically, non-interactive MPEG editing does not have to be performed in real-time. Therefore, some of the time constraints that apply to real-time operations do not apply to non-interactive MPEG editing. For example, it was explained above that due to timing constraints RAID error correction techniques are not used during fast forward and fast rewind operation. Since such timing constraints do not apply to non-interactive MPEG editing, RAID is used during the fast forward and fast rewind operations performed to produce edited MPEG file 510.

For the purpose of explanation, the various data repositories used in the editing process are illustrated as files stored on storage device 140. However, this form and location of this data may vary from implementation to implementation. For example, the various files may be stored on separate storage devices. Further, a user interface may be provided which allows a user to operate graphical controls to specify the parameters for a series of splices.

XXII. Distributed System

As explained above, the tasks performed during the real-time transmission of MPEG data streams are distributed between the stream server 110 and the video pump 130. The distributed nature of this architecture is enhanced by the fact that the video pump 130 does not require access to tag file 106, and stream server 110 does not require access to MPEG file 104. Consequently, stream server 110 and video pump 130 may operate in different parts of the network without adversely affecting the efficiency of the system 100.

An advantage of the distributed nature of the invention described herein is that improved quality video information may be added to the system at any time.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of manipulating digital video data comprising:

accessing digital audio-visual data, representing an audio-visual work and including data for a plurality of video frames;

determining a start position for frame data representing at least two of the plurality of frames, wherein said start position of a frame is a location of a first byte of the frame;

generating tag data including data representing the start position and other frame related data for at least two of the plurality of frames; and storing the tag data separate from the digital audio-visual data.

2. The method of claim 1, wherein the tag data includes a time value for each frame.

3. The method of claim 1, wherein the digital audio-visual data further includes non-video data and the tag data includes data referencing the non-video data.

4. The method of claim 1, wherein the other frame related data includes data representing an end position for each frame.

5. The method of claim 1, wherein the digital audio-visual data represents different types of frames and the other frame related data includes data indicating a frame type for each of the video frames.

6. The method of claim 5, wherein the digital audio-visual data is MPEG data.

7. The method of claim 6, wherein the tag data includes, for each video frame, state data representing a state of one or more state machines.

8. The method of claim 1, wherein the tag data is generated as the audio-visual work is displayed.

9. The method of claim 8, wherein the tag data is saved as a separate file.

10. The method of claim 1, wherein the digital audio-visual data is stored in multiple storages.

11. The method of claim 1, wherein the digital audio-visual data is stored remote from where it is displayed.

12. The method of claim 11, wherein the digital audio-visual data is communicated over a network to the location where it is displayed.

13. The method of claim 1, further comprising:

displaying the audio-visual work from a first position in the digital audio-visual data;

receiving a control signal while displaying;

inspecting the tag data;

determining a target position based on the inspected tag data;

ceasing to perform the audio-visual work from the first position;

accessing the target position in the digital representation of the audio-visual work; and performing the audio-visual work from the accessed target position.

14. The method of claim 13, wherein the control signal indicates a determinable target position, different from the first position, in the digital data.

15. The method of claim 13, wherein determining the target position includes reading the tag data to determine a start position of a frame for the target.

16. The method of claim 13, wherein determining the target position includes determining a target frame based on the inspected tag data and determining the target position to be a position, within the digital audio-visual data, corresponding to the target frame.

17. The method of claim 13, wherein the control signal indicates a determinable period of time and the target position is determined based on the first position and the determinable period of time.

18. The method of claim 17, wherein inspecting the tag data includes inspecting a time value and determining the target position is based upon the inspected time value and the determinable period of time.

19. The method of claim 13, further comprising communicating prefix data prior to communicating data from the target position.

20. The method of claim 13, wherein the digital audio-visual data represents different types of frames, the other frame related data includes data indicating a frame type for each the video frame and determining the target position is based upon the frame type of the video frames at or near the target position.

21. The method of claim 1, further comprising:
displaying the audio-visual work at a first video-frame display rate;
receiving a control signal, while displaying, indicating that the audio-visual work is to be displayed at a second video-frame display rate different from the first video-frame display rate; and
displaying the audio-visual work at the second video-frame display rate.

22. The method of claim 21, wherein the second video-frame display rate is greater than the first video-frame display rate.

23. The method of claim 22, wherein frames are selected for display at the second video-frame display rate based on video frame types.

24. The method of claim 21, wherein the second video-frame display rate causes the display of the audio-visual data to be in reverse.

25. The method of claim 21, further comprising selecting a selected set of video frames from the audio-visual work based on the second video-frame display rate and sizes of video frame data that correspond to said video frames.

26. The method of claim 25, wherein said selecting the selected set of video frames includes repeatedly performing the steps of:
determining a bit budget; and
determining a size of the frame data that corresponds to a current frame and if the size of the frame data that corresponds to the current frame exceeds said bit budget, then not selecting said current frame as a video frame in said selected set of video frames and if the size of the frame data that corresponds to the current frame does not exceed said bit budget, then selecting said current frame as a video frame in said selected set of video frames.

27. The method of claim 26, wherein the bit budget is based on a first time value associated with a most recently selected video frame, a second time value associated with the current frame, said second presentation rate and a data transfer rate.

28. The method of claim 21, further comprising selecting a selected set of video frames from the audio-visual work based on the second video-frame display rate and on video frame types.

29. The method of claim 28, wherein said sequence of video frame data includes at least one type of video frame data from which said corresponding video frame can be constructed without reference to any other video frame data, and at least one type of video frame data from which said corresponding video frame cannot be constructed without reference to any other video frame data.

30. The method of claim 29, wherein said selecting comprises skipping a frame that requires information that has already been skipped.

31. The method of claim 21, further comprising selecting a selected set of video frames from the audio-visual work and inserting prefix data prior to each selected video frame.

32. The method of claim 1, further comprising:
displaying the audio-visual work in accordance with a set of streaming constraints;
receiving a signal indicating a relaxation of said streaming constraints;
in response to said signal, accessing a set of improved quality information, said improved quality information comprising an improved quality version of at least a subset of the information in said audio-visual work; and
displaying at least a subset of the improved quality information.

33. The method of claim 32, wherein said accessing the set of improved quality information comprises:
determining a first reference point in the audio-visual work;
correlating the first reference point with a second reference point in the set of improved quality information; and
retrieving the subset of the improved quality information based on said second reference point.

34. The method of claim 32, wherein the set of improved quality information comprises a still image.

35. The method of claim 34, wherein the still image takes the form of an image file selected from the group consisting of a JPEG file, a GIF file, a BMP file, a TIFF file, a PIC file, a MAC file and a PCD file.

36. The method of claim 32, wherein the set of improved quality information comprises preprocessed audio-visual information ready to be streamed.

37. The method of claim 32, wherein the signal indicates that information is to be displayed at a slower presentation rate.

38. The method of claim 37, wherein said displaying at least a subset of the set of improved quality information comprises displaying a plurality of still images.

39. The method of claim 37, further comprising sending the subset of the set of improved quality information to a client at an appropriate streaming rate to accommodate the slower presentation rate.

40. The method of claim 32, wherein the signal indicates that information display is to be paused.

41. An audio-visual information delivery system for managing the display of an audio-visual work comprising:
a source of digital audio-visual data representing of an audio-visual work for display, the digital data including frame data representing a plurality of the video frames;
a tag data generator configured to generate tag data representing a start position and other frame related data for at least two of the plurality of frames, wherein said start position of a frame is a location of a first byte of the frame; and
a storage for the tag data, separate from the digital audio-visual data source.

42. The system of claim 41, wherein the tag data includes a time value for each frame.

43. The system of claim 41, wherein the digital audio-visual data further includes non-video data and the other tag data includes data referencing the non-video data.

44. The system of claim 43, wherein the other frame related data includes data representing an end position for each frame.

45. The system of claim 43, wherein the digital audio-visual data represents different types of frames and the other frame related data includes data indicating a frame type for each video frame.

46. The system of claim 45, wherein the digital audio-visual data is MPEG data.

47. The system of claim 46, wherein the tag data includes, for each video frame, state data representing a state of one or more state machines.

48. The system of claim 43, wherein the tag data is generated as the audio-visual work is displayed.

49. The system of claim 48, wherein the tag data is saved as a separate file.

50. The system of claim 43, wherein the digital audio-visual data source includes multiple separate storages.

51. The system of claim 43, wherein the digital audio-visual data source includes storage remote from where the audio-visual work is displayed.

52. The system of claim 51, wherein the digital audio-visual data is communicated over a network from the audio-visual storage to the location where it is displayed.

53. The system of claim 41, wherein the system is configured to:
    display the audio-visual work from a first position in the digital audio-visual data;
    receive a control signal;
    inspect the tag data in response to the received signal;
    determine the target position based on the inspected tag data;
    cease performing the audio-visual work from the first position;
    access the target position in the digital representation of the audio-visual work; and
    continue performing the audio-visual work from the accessed target position.

54. The system of claim 53, wherein the control signal indicates a determinable target position, different from the first position, in the digital data.

55. The system of claim 53, wherein determining the target position includes reading the tag data to determine a start position of a frame for the target.

56. The system of claim 53, wherein the target position is determined by determining a target frame based on the inspected tag data and determining the target position to be a position, within the digital audio-visual data, corresponding to the target frame.

57. The system of claim 56, wherein the control signal indicates a determinable period of time and the target position is determined based on the first position and the determinable period of time.

58. The system of claim 57, wherein a time value in the tag data is inspected and the target position determined based upon the inspected time value and the determinable period of time.

59. The system of claim 58, wherein prefix data is inserted prior to data from the target position.

60. The system of claim 56, wherein the digital audio-visual data represents different types of frames, the other frame related data includes data indicating a frame type for each of the video frames and the system is configured to determine the target position based upon the frame type of the video frames at or near the target position.

61. The system of claim 41, wherein when the control signal is received when the audio-visual work is being displayed at a first video-frame display rate, the system is configured to cause the display of the audio-visual work at a second video-frame display rate different from the first video-frame display rate.

62. The system of claim 61, wherein the second video-frame display rate is greater than the first video-frame display rate.

63. The system of claim 62, wherein the system selects frames to display at the second video-frame display rate based on video frame types.

64. The system of claim 61, wherein the system causes the display of the audio-visual data to be in reverse.

65. The system of claim 61, wherein a selected set of video frames are selected from the audio-visual work based on the second video-frame display rate and sizes of video frame data that correspond to said video frames.

66. The system of claim 65, wherein the selected set of video frames are selected by the system repeatedly performing the steps of
    determining a bit budget; and
    determining a size of the frame data that corresponds to a current frame and if the size of the frame data that corresponds to the current frame exceeds said bit budget, then not selecting said current frame as a video frame in said selected set of video frames and if the size of the frame data that corresponds to the current frame does not exceed said bit budget, then selecting said current frame as a video frame in said selected set of video frames.

67. The system of claim 66, wherein the bit budget is based on a first time value associated with a most recently selected video frame, a second time value associated with the current frame, said second presentation rate and a data transfer rate.

68. The system of claim 61, wherein a selected set of video frames are selected from the audio-visual work based on the second video-frame display rate and video frame types.

69. The system of claim 68, wherein said sequence of video frame data includes at least one type of video frame data from which said corresponding video frame can be constructed without reference to any other video frame data, and at least one type of video frame data from which said corresponding video frame cannot be constructed without reference to any other video frame data.

70. The system of claim 69, wherein a frame is skipped that requires information that has already been skipped.

71. The system of claim 61, wherein a selected set of video frames are selected from the audio-visual work and prefix data is inserted prior to each selected video frame.

72. The system of claim 41, wherein the system is configured to:
    display the audio-visual work in accordance with a set of streaming constraints;
    receive a signal indicating a relaxation of said streaming constraints, wherein in response to the signal, the system accesses a set of improved quality information, said improved quality information comprising an improved quality version of at least a subset of the information in said audio-visual work; and
    display at least a subset of the improved quality information.

73. The system of claim 72, wherein the system accesses the set of improved quality information by determining a first reference point in the audio-visual work, correlating the first reference point with a second reference point in the set of improved quality information and retrieving the subset of the improved quality information based on said second reference point.

74. The system of claim 72, wherein the set of improved quality information comprises a still image.

75. The system of claim 74, wherein the still image takes the form of an image file selected from the group consisting of a JPEG file, a GIF file, a BMP file, a TIFF file, a PIC file, a MAC file and a PCD file.

76. The system of claim 72, wherein the set of improved quality information comprises preprocessed audio-visual information ready to be streamed.

77. The system of claim 72, wherein the signal indicates that information is to be displayed at a slower presentation rate.

78. The system of claim 77, wherein at least a subset of the set of improved quality information are displayed by displaying a plurality of still images.

79. The system of claim 77, wherein the subset of the set of improved quality information are sent to a client at an appropriate streaming rate to accommodate the slower presentation rate.

80. The system of claim 72, wherein the signal indicates that information display is to be paused.

* * * * *